United States Patent [19]

Arnold et al.

[11] Patent Number: 5,515,137
[45] Date of Patent: May 7, 1996

[54] PATIENT INFORMATION APPARATUS

[75] Inventors: Carl B. Arnold, Christiana, Del.; William S. Page, Port Deposit, Md.

[73] Assignee: E. I. Du Pont de Nemours and Company, Wilmington, Del.

[21] Appl. No.: 458,308

[22] Filed: Jun. 2, 1995

Related U.S. Application Data

[62] Division of Ser. No. 796,206, Nov. 22, 1991, Pat. No. 5,453,813.

[51] Int. Cl.⁶ .............................. G03B 27/52; H05G 1/28
[52] U.S. Cl. .............................. 355/40; 378/166; 378/181
[58] Field of Search ........................ 355/40, 41; 378/162, 378/165, 166, 181, 174

[56] References Cited

U.S. PATENT DOCUMENTS

| | | | |
|---|---|---|---|
| 3,221,620 | 12/1965 | Sano et al. | 95/1.1 |
| 3,386,355 | 6/1968 | Erickson | 95/1.1 |
| 3,675,014 | 7/1972 | Perl | 250/66 |
| 3,836,783 | 9/1974 | Stievenart et al. | 250/481 |
| 3,888,587 | 6/1975 | Perl | 355/112 |
| 4,514,958 | 5/1985 | Hoorn . | |
| 5,136,626 | 8/1992 | Ort | 378/165 |

FOREIGN PATENT DOCUMENTS

| | | | |
|---|---|---|---|
| 0014436 | 8/1980 | European Pat. Off. | 378/166 |
| 2346576 | 5/1975 | Germany | 378/166 |
| 2747591 | 4/1979 | Germany | 378/166 |
| 3629462A1 | 3/1988 | Germany . | |
| 57-122429 | 7/1982 | Japan . | |
| 1-76044 | 3/1989 | Japan | 378/166 |
| 2-205839 | 8/1990 | Japan | 378/165 |
| 3-171041 | 7/1991 | Japan | 378/165 |
| 3-174139 | 7/1991 | Japan | 378/165 |
| 1355854 | 6/1974 | United Kingdom | 378/166 |
| 89/06377 | 7/1989 | WIPO . | |

OTHER PUBLICATIONS

*Patent Abstracts of Japan*, vol. 13291, Jul. 6, 1989, Abstract of Publication No. 1–072133, Iketa, Y., "Device for Imprinting Film Data for X–ray Photographing Device".

Primary Examiner—Matthew S. Smith

[57] ABSTRACT

The present invention relates to an electronic assembly, apparatus and process for scanning input information from patient information cards, processing the information and imaging the processed information on films and, in particular, on X-ray films in automatic daylight film handling systems.

8 Claims, 10 Drawing Sheets

PATIENT INFORMATION APPARATUS

This is a division of U.S. patent application Ser. No. 07/796,206, filed Nov. 22, 1991 now U.S. Pat. No. 5,453,813.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to an electronic assembly, apparatus and process for scanning input information from patient information cards, processing the information and imaging the processed information on films and, in particular, on X-ray films in automatic daylight film handling systems.

2. Description of Related Art

Until the advent of automatic film handling systems, film sheets, and in particular X-ray film sheets, were handled manually by loading the film sheet into a cassette in the dark, exposing it under daylight conditions and then taking the cassette into a darkroom, opening it and placing the film sheet into a processor all in the dark.

Prior to the use of automatic film handling systems, printed labels were applied by adhesives to radiographs after the film was processed, i.e., developed. Later, but still before the use of automatic film handling systems, a separate and distinct direct image camera was used to imprint patient identification on radiographs prior to inserting the cassette or film into a film processing machine. See, for instance, U.S. Pat. No. 3,221,620.

Various systems are now available for the automatic handling of photographic film sheets and, in particular, X-ray film sheets (or radiographs) in daylight conditions. Most automatic film handling systems do not enable films to be labelled by the system. Instead, prior to insertion into the automatic film handling system, patient data and other information including time and date which are useful for tracking and legal purposes must be added to the film in a stand alone workstation or a workstation attached to feed the film exposed with patient ID information or the cassette containing the film exposed with patient ID information into an entrance port of the automatic film handling system. See, for instance, U.S. Pat. Nos. 3,836,783 and 3,888,587.

One prior art automatic film handling system includes a direct imaging camera within the system itself. Patient information is printed on a card. The card is flash illuminated. The reflected image is directed by lenses, prisms and mirrors directly onto a previously unexposed area of the film prior to processing. Other information, such as time and date, can be added by reflecting a light beam onto a representation of the time and date. The light reflected from the representation of the time and date is combined with the light reflected from the card such that both the card information and the other information is reflected onto the previously unexposed area of the film prior to development of the film.

It is desirable to image patient information on a film such that the image is readable (i.e., right reading) by a radiologist when the radiologist is viewing the film as if the patient was in a standard position with respect to the radiologist, such as facing the radiologist. However, a radiograph may be taken with the patient facing towards or away from an X-ray source. To enable the patient information image to be right reading to the radiologist in both exposure situations, one prior art automatic film handling system with a direct imaging camera within the system itself includes two distinct card holding mechanisms for receiving a patient identification card. One of the mechanisms is accessible from one side of the system and the other mechanism is accessible from another side of the system. The patient information card is inserted in the first mechanism if the radiograph was taken with the patient facing towards the X-ray source. The patient information card is inserted in the other one of the mechanisms if the radiograph was taken with the patient facing away from the X-ray source. This prior art system has a distinct illumination source and a different set of optics for reflecting and directing an image from a card in each one of the two card holding mechanisms to the film to be imaged.

All prior art automatic X-ray film handling systems which include a direct imaging camera within the system itself only produce a negative image (i.e., white characters on a black background) of patient information on the film. Light is absorbed by black and reflected by white. Patient ID cards are black typing on white background. As such, light directed towards the patient ID card by prior art direct image cameras is reflected off the white backgrounds of the cards and absorbed by the black typing on the cards. Light imaged on X-ray film makes it black. Thus, the reflected light from the white background of the card is what exposes the X-ray film producing a black field with clear letters on the radiograph. Although a positive image (i.e., black characters on a white background) is typically easier to read, prior art automatic X-ray film handling systems can not produce a positive image of the patient information on the film.

All prior art automatic X-ray film handling systems which include a direct imaging camera within the system itself are limited as to where the patient information can be imaged onto the film such that the patient information is right reading. Upper edge portions of radiographs are frequently held by clips to illumination panels. As such, there is a need to image patient ID information on the bottom of a radiograph, rather than on the top. However, most X-ray film cassettes only have one area blocked by lead to allow imaging of patient ID information subsequent to general exposure of the patient to X-rays. Typically, the blocked area is the upper left corner of the cassette. No prior art automatic X-ray film handling system which includes a direct imaging camera within the system is capable of imaging patient ID information from a card onto this blocked area such that the imaged area is right reading and on the bottom of the film.

No prior art automatic X-ray film handling system which includes a direct imaging camera within the system is capable of adding information to the reflected images or providing the operator with options to change the size, font and/or format of such information.

World markets with diverse equipment offerings and needs demand more flexible assemblies, apparatus and processes for placing patient identification on films and, in particular, on X-ray films in automatic daylight film handling systems.

SUMMARY OF THE INVENTION

The present invention is related to an apparatus for handling a cassette and a first sheet of X-ray film contained in the cassette, the sheet having an unexposed area, the apparatus comprising:

a light tight housing having a housing slot for receiving the cassette;

a cassette opening-closing assembly in the housing for opening the cassette for removal of the first sheet and reloading with a second sheet of unexposed X-ray film and thereafter for closing the cassette;

an initial transport mechanism in the housing for transporting the cassette from the slot to the cassette opening-closing assembly and from the cassette opening-closing assembly out the slot after removal of the sheet and reloading the cassette with the second sheet;

a vacuum-operated lifting and transporting assembly in the housing for removing the first sheet from the cassette and transporting the first sheet to a patient identification station and then to a subsequent station;

a film reloading apparatus in the housing for reloading the cassette with the second sheet after the first sheet is removed from the cassette; and an electronic patient information imaging assembly for receiving a patient information card from outside the housing, scanning input information in the housing from the patient information card, electronically processing the input information in the housing, and imaging patient information in the housing on the unexposed area of the first sheet while the first sheet is at the patient identification station.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
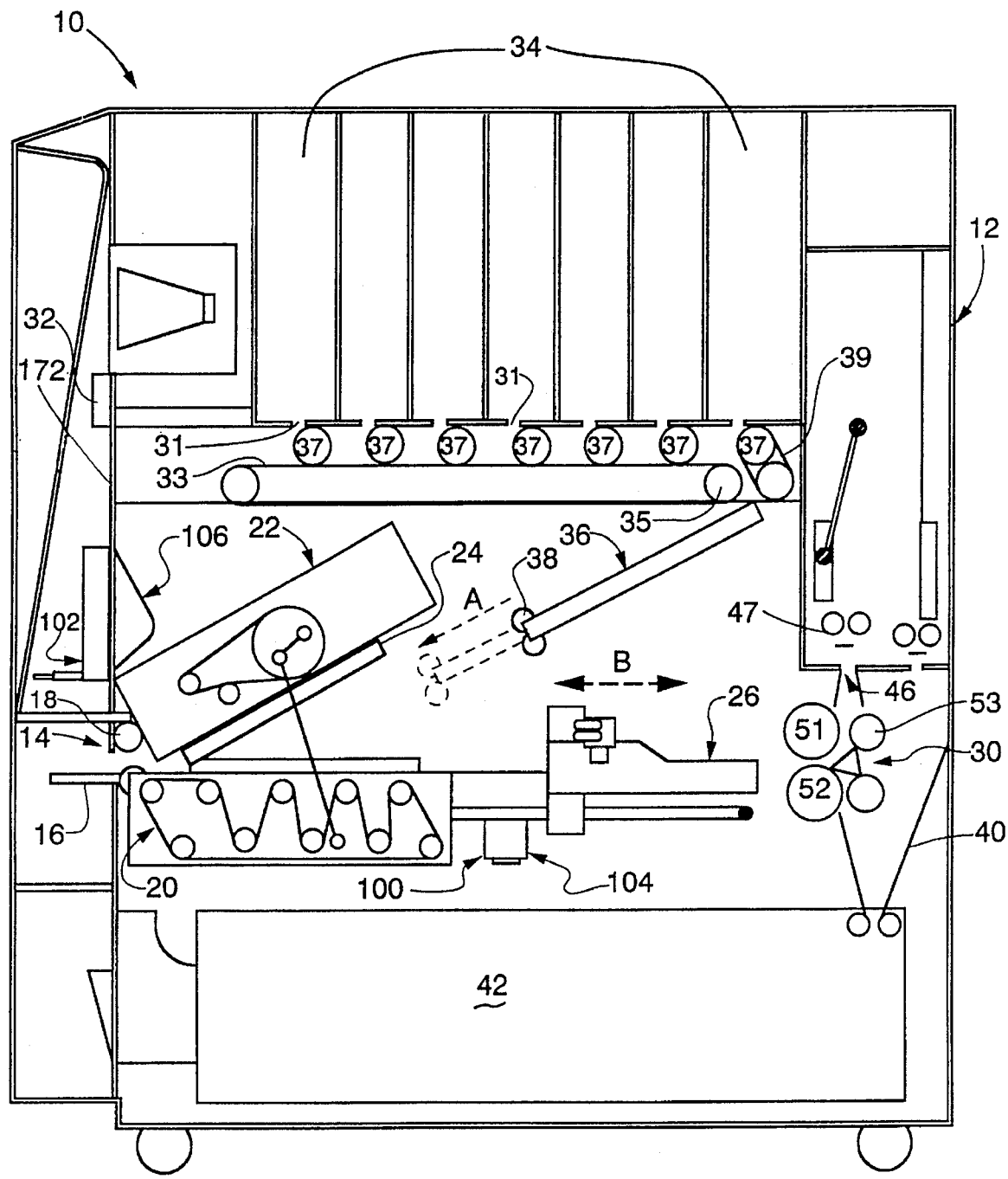
FIG. 1 is a simplified schematic cross sectional view of an automatic daylight film handling apparatus including a schematic representation of an electronic patient information imaging assembly in accordance with the present invention.

Throughout the following detailed description, similar reference characters refer to similar elements in all figures of the drawings.

Referring to FIG. 1, an automatic daylight film handling apparatus 10 is shown with an electronic patient information imaging assembly 100 of the present invention. The electronic patient information imaging assembly 100 comprises a scanner apparatus 102, a camera apparatus 104 and an electronic control system 106.

A brief description of the operation of the automatic film handling apparatus 10 is helpful in understanding the electronic patient information imaging assembly 100 of the present invention. The operation of the automatic film handling apparatus 10 begins by an operator inserting a closed cassette having an exposed film into an entrance slot 14 in a substantially light tight housing adjacent a feed tray 16 of the film handling apparatus 10. The slot 14 has a light gate (not depicted) which opens and closes to allow the cassette into the light tight housing of the apparatus 10 and yet prevents light from entering into an interior of the apparatus 10. A pair of nip rollers 18 inside the entrance slot 14 initially transports the cassette from the feed tray 16. A plurality of rollers 20 transports the cassette further into a cassette opening-closing assembly 22. The pair of nip rollers 18 and the plurality of rollers 20 comprise an initial transport mechanism for transporting the closed cassette to an initial station within the apparatus 10. During transport of the cassette into the opening-closing assembly 22, the cassette is aligned to a front corner of the opening-closing assembly 22. The opening-closing assembly 22 opens the cassette by disengaging latches on the cassette and lifting a door of the cassette. Exposed film in the opened cassette 24 is removed from the cassette 24 by a vacuum-operated lifting and transporting assembly 26 which lifts and transports the exposed film to a patient identification station adjacent the camera apparatus 104.

A card with patient identification information and other data written, printed or typed on it corresponding to the patient whose radiograph is adjacent the camera apparatus 104 is inserted in the scanner apparatus 102. The scanner apparatus 102 scans the information and other data from the card. The electronic control system 106 receives electronic signals representative of the patient identification information and other data from the scanner apparatus 102. The electronic control system 106 digitizes the information and other data, potentially modifies the information and other data and drives the camera apparatus 104 to image the patient information, other data and possibly additional information or data on a previously unexposed area of the film. After the camera apparatus 104 images the patient information, other data and possibly additional information or data onto the film, the vacuum-operated lifting and transporting assembly 26 transports the film to a first roller 51 and a second roller 52 of a film or sheet diverting apparatus 30.

The vacuum-operated lifting assembly 26, for example, can be as disclosed in U.S. Pat. No. 5,083,764; and the film or sheet diverting apparatus 30 can be as disclosed in U.S. Pat. No. 5,228,681 and assigned to the assignee of the present invention.

The automatic daylight film handling apparatus 10 includes film reloading apparatus for reloading the cassette with non-exposed film. The operator may input at a console 32 associated with the film handling apparatus 10 the type of film desired for the re-loading of the cassette 24. Alternately, a microcomputer (not depicted) associated with the apparatus 10 can determine the type of film needed from a sensor (not depicted) reading a label on the cassette 24. An appropriate fresh, i.e., non-exposed, film is dispensed from one of a plurality of film storage magazines 34 through a dispensing slot 31 onto a first endless belt 33 which is driven by a roller 35. For a detailed description of a suitable film storage magazine 34 that can be used as stated herein, see U.S. Pat. No. 4,482,146. The first belt 33 is moving clockwise in FIG. 1 when a fresh film is dispensed so that a leading edge of the fresh film is directed to a nip formed between a top surface or run of the first belt 33 and a roller 37 substantially below the film storage magazine 34 and beside the dispensing slot 31. Since each roller 37 associated with a film storage magazine 34 forms a nip between itself and the top run of the first belt 33, the fresh film is transported on the first belt 33 to a nip formed between the first belt 33 and a second endless belt 39. The second belt 39 is driven by frictional contact with the first belt 33 and is moving counter-clockwise in FIG. 1. When the leading edge of the film contacts the second belt 39, the film is directed into the nip between the first belt 33 and second belt 39 and the film is transported to a chute 36. (It should be understood that each of the first endless belt and the second endless belt can include one or more belts.) The fresh film travels down the chute 36 to a pair of nip rollers 38 which hold the fresh film and extend in the direction of arrow A in FIG. 1 to place the fresh film into the opened cassette 24. The opening-closing assembly 22 closes the cassette 24 and secures the latches on the cassette 24. The plurality of rollers 20 transports the cassette 24 from the opening-closing assembly 22 and eject the cassette onto the feed tray 16.

Meanwhile, a sensor (not shown) detects the presence of the exposed film at a nip between the first roller 51 and the second roller 52 of the sheet diverting apparatus 30 and sends the film presence information to the microcomputer. The microcomputer also receives information from a second sensor (not shown) on the presence of another film in a feed tray 40 of a processor 42 associated with the film handling apparatus 10. The microcomputer determines whether the film can be transported directly into the processor 42 or should be transported into an intermediate film storage apparatus 12 associated with the film handling apparatus 10 for dispensing at a later time, and directs the movement of the sheet diverting apparatus 30 to thereby guide the exposed film to the appropriate path accordingly. In the case where the film is directed into the intermediate film storage apparatus 12, the film is transported vertically or substantially vertically by the first roller 51 and a third roller 53 of the diverting apparatus 30 into the entrance 46 of the intermediate storage apparatus 12 and to a nip between a pair of rollers 47, such as, within the storage apparatus 12. For a detailed description of a suitable intermediate film storage apparatus 12 that can be used as, see U.S. Pat. No. 5,211,385 and assigned to the assignee of the present invention.

Figure 2:
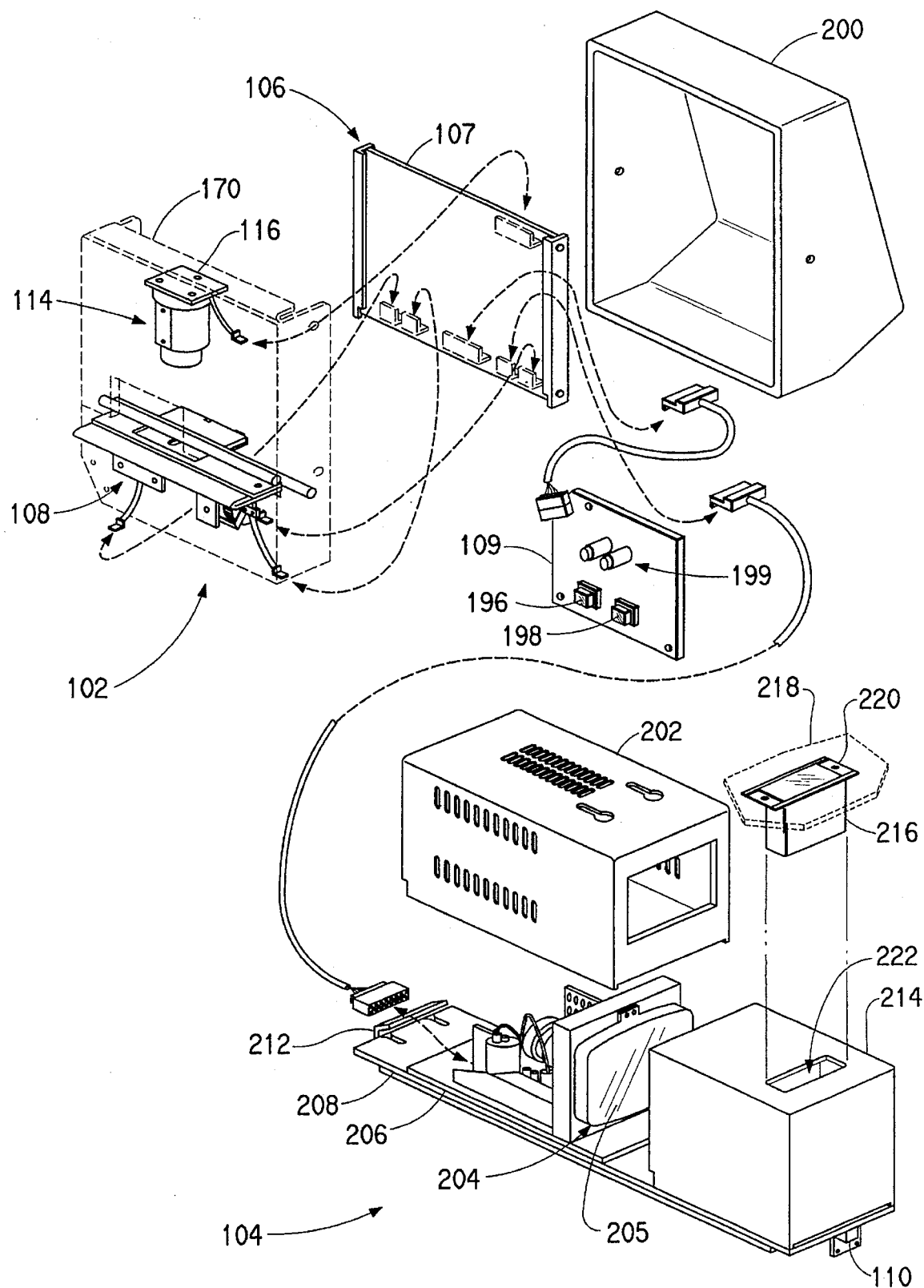
FIG. 2 is a perspective view of the electronic patient information imaging assembly with parts exploded from one another including a scanner apparatus, a camera apparatus and an electronic control system.

FIG. 2 is a perspective view of the electronic patient information imaging assembly 100 with parts exploded from one another. Referring to FIG. 2, the parts of the electronic patient information imaging assembly 100 include the scanner apparatus 102, the camera apparatus 104 and the electronic control system 106.

Figure 3:
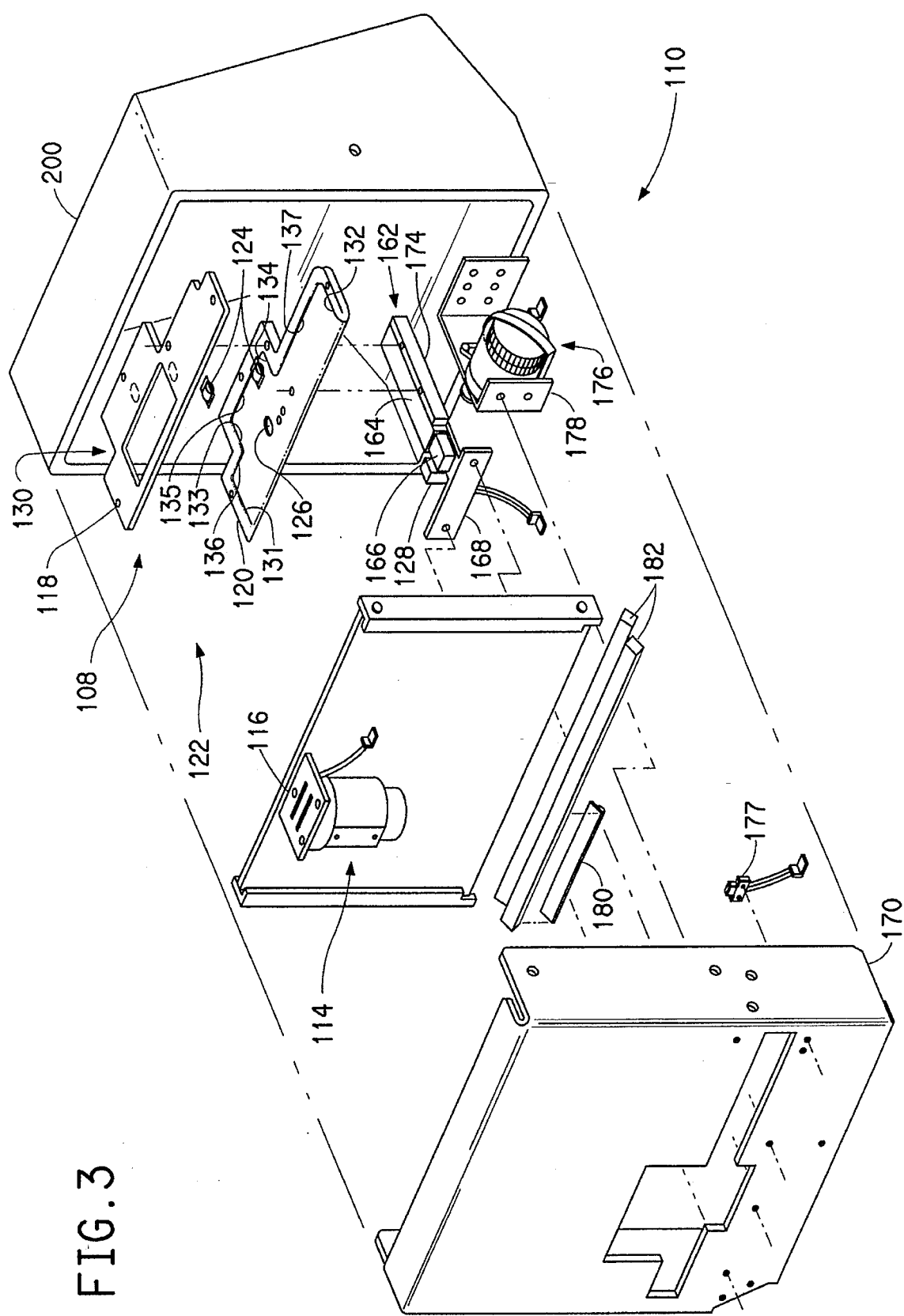
FIG. 3 is an enlarged perspective view of the scanner apparatus with parts exploded from one another including a universal card holder, a translation mechanism, a light source, a first lens assembly and a sensor assembly.

FIG. 3 is an enlarged perspective view of the scanner apparatus 102 with parts exploded from one another. Referring to FIGS. 2 and 3, the scanner apparatus 102 includes a universal card holder 108, a translation mechanism 110, a light source 112, a first lens assembly 14 and a sensor assembly 116.

The universal card holder 108 comprises a card window frame 118 mounted to a card holder 120 defining a slot 122 between the card holder 108 and the card window frame 118 for inserting cards. Spring members 124 are in the slot 22 and connected in recesses to the card window frame 118 to hold the inserted card in place against the card holder 20. Alternatively, the spring members 124 are connected in recesses to the card holder 120 to hold the inserted card against the card window frame 118. The card holder 120 has a passage 126 through which a sensor 128 can sense the presence of a card. The card window frame 118 defines a window 130 through which an image to be scanned on an inserted card can be viewed by an operator and scanned by the sensor assembly 116. The card holder 120 further has a first abutment surface 131, a second abutment surface 132, a third abutment surface 133, a fourth abutment surface 134, a fifth abutment surface 135, a sixth abutment surface 136, and a seventh abutment surface 137 for contacting edges of different cards inserted into the universal card holder 108. The first 131 and second 132 abutment surfaces are parallel to one another and spaced a first distance $d_1$ from one another. The third 133 and fourth 134 abutment surfaces are parallel to one another, parallel to the first 131 and second 132 abutment surfaces, and spaced a second distance $d_2$ from one another where the second distance $d_2$ is less than the first distance $d_1$. The fifth abutment surface 135 is perpendicular to the first through fourth abutment surfaces 131–134 and connects first ends of the third 133 and fourth 134 abutment surfaces. The sixth abutment surface 136 is perpendicular to the first through fourth abutment surfaces 131–134 and interconnects an inner end of the first abutment surface 131 and a second end of the third abutment surface 133. The seventh abutment surface 137 is perpendicular to the first through fourth abutment surfaces 131–134 and interconnects an inner end of the second abutment surface 132 and a second end of the fourth abutment surface 134. The sixth 136 and seventh 137 abutment surfaces are coplanar. Joints between connecting abutment surfaces (specifically Joints between the first abutment surface 131 and the sixth abutment surface 136, between the third abutment surface 133 and the sixth abutment surface 136, between the third abutment surface 133 and the fifth abutment surface 135, between the fourth abutment surface 134 and the fifth abutment surface 135, between the fourth abutment surface 134 and the seventh abutment surface 137, between the second abutment surface 132 and the seventh abutment surface 137) can be curved, right angled, other angled or other shaped. The purpose of the first through seventh abutment surfaces 131–137 is to contact edges of different existing standard size patient identification cards thereby aligning and registering the cards within the universal card holder 108 such that areas to be scanned on the cards are positioned under the window 130 when the card is fully inserted in the universal card holder 108 and the card is abutting against an appropriate one or more of the abutment surfaces 131–137.

Figure 4:
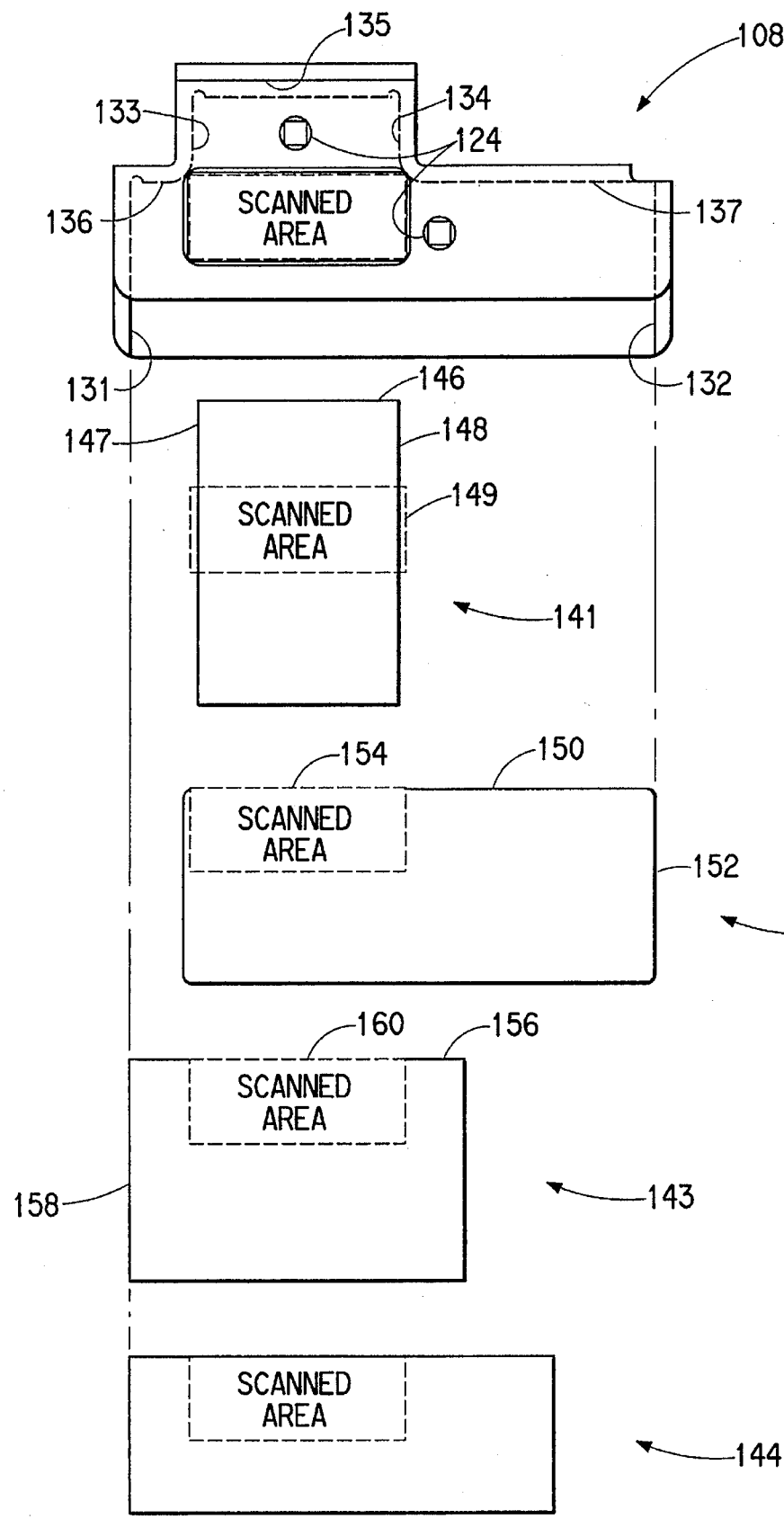
FIG. 4 is a schematic illustration showing a plurality of patient information cards and how they insert in the universal card holder.

This can be better understood in reference to FIG. 4 which shows a plurality of patient information cards 141–144 and how they insert in the slot 122 of the universal card holder 108. The patient information card 141 illustrates the standard Du Pont DayLight™ patient ID card. This card 141 is about 120 millimeters (mm) long by 76 mm wide. This card 141 is properly positioned in the slot 122 of the universal card holder 108 when a first end edge 146 of the card 141 is in contact with the fifth abutment surface 135. Also when properly registered within the universal card holder 108, a first side edge 147 of the card 141 may also be in contact with the third abutment surface 133 and/or a second side edge 148 of the card 141 may also be in contact with the fourth abutment surface 134. When properly registered within the universal card holder 108, a scanning area 149 running entirely across a middle section of the card 141 is appropriately aligned under the window 130 so information or data on the scanning area 149 can be scanned by the sensor assembly 116.

The patient information card 142 illustrates the standard IBM style patient ID punch card. This card 142 is about 82 mm long by 187 mm wide. This card 142 is properly positioned in the slot 122 of the universal card holder 108 when a first end edge 150 of the card 142 is in contact with the seventh abutment surface 137 and a right side edge 152 of the card 142 is in contact with the second abutment surface 132. When properly registered within the universal card holder 108, a scanning area 154 located generally on an upper left corner of the card 142 is appropriately aligned under the window 130 so information or data on the scanning area 154 can be scanned by the sensor assembly 116.

The patient information card 143 illustrates the standard 3 inch by 5 inch (about 76 mm long by 127 mm wide) Eastman Kodak dark room patient ID card. This card 143 is properly positioned in the slot 122 of the universal card holder 108 when a first end edge 156 of the card 143 is in contact with the sixth and seventh abutment surfaces 136, 137 and a left side edge 158 of the card 143 is in contact with the first abutment surface 131. When properly registered within the universal card holder 108, a scanning area 160 located generally on a middle section adjacent the first end edge 156 of the card 142 is appropriately aligned under the window 130 so information or data on the scanning area 160 can be scanned by the sensor assembly 116.

The patient information card 144 illustrates other standard size cards similar to the Eastman Kodak dark room patient ID card that register in the universal card holder 108 similar to the Eastman Kodak dark room patient ID card 143, but are not 3 inch by 5 inch cards. For instance, the card 144 may be 2 inches by 6 inches or other measurements.

Referring back to FIG. 3, the translation mechanism 110 comprises a linear ball slide 162 with an outer slide part 164 and an inner slide part 166. The outer slide part 164 is mounted to the card holder 120. The inner slide part 166 is mounted to a first bracket 168 which in turn is mounted to a scanner frame 170 which in turn is mounted to a front door panel 172. See FIG. 1. A gear rack 174 is fixed to the outer slide part 164. A pinion on a shaft of a stepper motor assembly 176 including a stepper motor and gear box engages the gear rack 174. The stepper motor assembly 176 is mounted on a second bracket 178 which in turn is connected to the scanner frame 170. The stepper motor assembly 176 is electrically connected to the electronic control system 106 such that when instructed to do so the stepper motor assembly 176 linearly moves the universal card holder 108 one step at a time across a scan line of the sensor assembly 116 allowing the scanning areas of the cards to be incrementally scanned one line at a time by the sensor assembly 116 as the scanning area moves under it step by step of the motor assembly 176. A sensor 177 is mounted to the scanner frame 170 and is electrically connected to the electronic control system 106. The sensor 177 can be a photoreflective sensor or limit switch which generates a signal when the universal card holder 108 is in its fully outward extended or home position.

The sensor 128 is also mounted on the bracket 168 and is electrically connected to the electronic control system 106. The sensor 128 can be a photoreflective sensor or limit switch used to detect and send signals representative of the presence or absence of a card in the universal card holder 108 by sensing through the hole 126.

Figure 5:
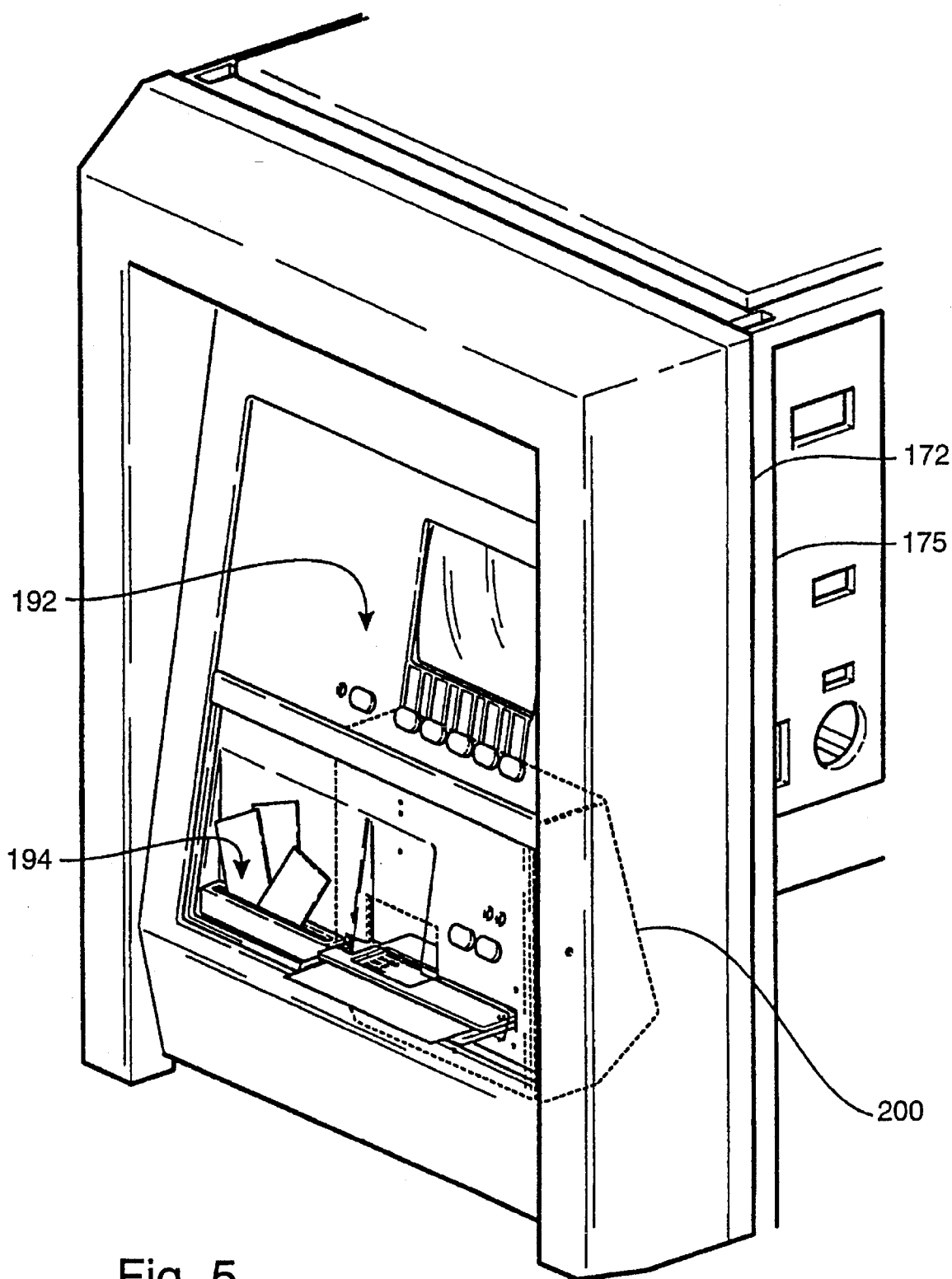
FIG. 5 is a perspective view of the universal card holder as seen by an operator.
Figure 5A:
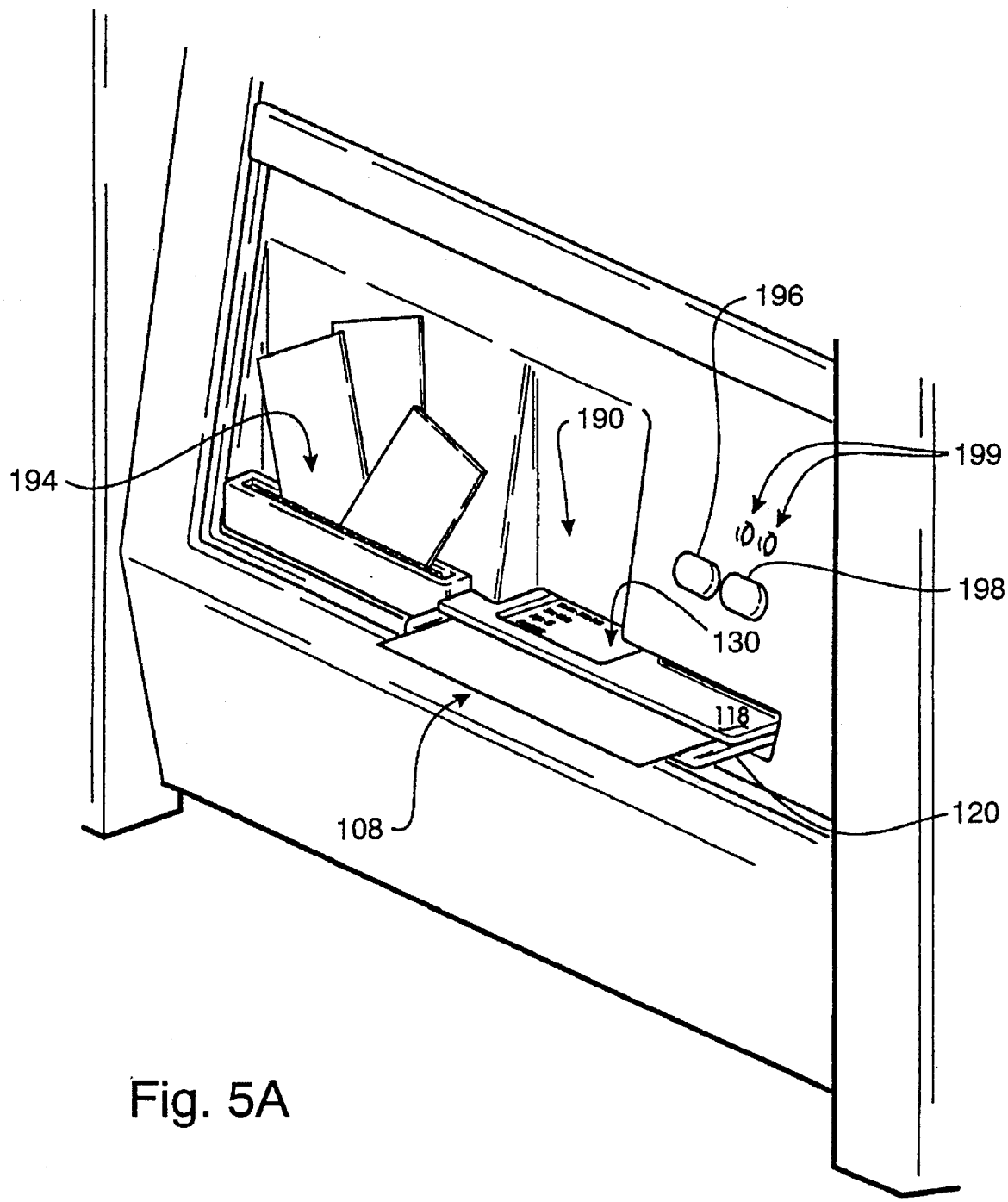
FIG. 5a is an enlarged perspective view of the universal card holder as seen by an operator.

The scanner frame 170 and the front door panel 172 have openings in them for receiving the universal card holder 108 such that an operator has access to the slot 122 and visible access to the window 130 when the universal card holder 108 is in its fully outward extended or home position. FIG. 5 illustrates the front door panel 172 as seen by an operator. FIG. 5a is an enlarged perspective view the universal card holder 108 as seen by an operator. The front door panel 172 has a viewing recess 190 therein to allow the operator to view the area to be scanned through the window 130 when the universal card holder 108 is in its fully outward extended or home position. An operator interface 192 which is electrically interconnected to the electronic control system 106 can be mounted on the front door panel 172. The operator interface 192 can have a viewing display and input keys. A stationary card holder 194 can be provided on the front door panel for holding cards that either already have been scanned or are to be scanned by the scanner apparatus 102. The stationary card holder 194 can be a slot with spring members mounted in the slot similar to the spring members 124 positioned in the slot 122 for biasing the cards against the front door panel 172. A manual scan control button 196 and an AP/PA toggle switch 198 can be mounted on the front door panel 196 and electrically interconnected to the electronic control system 106. Pressing the manual scan control button 196 causes the scanner apparatus 102 to scan the card which is present in the universal card holder 108. Pressing the toggle switch 198 causes the electronic control system 106 to modify the scanned image so it can be either a front reading print or a back reading print when imaged on the film by the camera apparatus 104. A front reading print is used when the patient faced the radiation source when the patient was exposed to X-rays. A back reading print is used when the patient's back was closest to the radiation source when the patient was exposed to X-rays. A pair of lights 199, e.g., LEDs, can be provided with one on when the toggle switch 198 is set to modify the scanned image to be a front reading print and the other one on when the toggle switch 198 is set to modify the scanned image to be a back reading print. The front door panel 172 can be mounted to a system mainframe 175.

The light source 112 preferably comprises a pair of light emitting diode (LED) linear arrays 180 mounted on bar supports 182 which in turn are mounted at their ends to the scanner frame 170. The LED arrays 180 are positioned to direct light at an angle with respect to vertical and horizontal which causes a reflected image of the scan line to pass between the LED arrays 180 to the first lens assembly 114 which is mounted on the scanner frame above the bar supports 182. A suitable LED array that can be used for the LED arrays 180 is commercially available from Panasonic Industrial Co. with offices in Secaucus, N.J., under part number LN483126UN-9. The sensor assembly 116 is mounted on the first lens assembly 114 to receive the reflected image of the scan lines as directed and focused by the first lens assembly 114. A suitable assembly that can be used for the first lens assembly 114 is commercially available from JML Optical Industries with offices in Rochester, N.Y., under catalog number 73235. The sensor assembly 116 is electrically connected and sends signals representative of the reflected image to the electronic control system 106. A suitable CCD linear image sensor that can be used in the sensor assembly 116 is commercially available from Toshiba Semiconductor Co. with offices in Sunnyvale, Calif. under part number TCD 132. A cover 200 is attached to the scanner frame 170 to confine light, including light generated by the scanner apparatus 102, from entering the remainder of the automatic daylight film handling apparatus 10. The cover 200 also helps keep dust out of the remainder of the automatic daylight film handling apparatus 10.

FIG. 2 includes an enlarged view of the camera apparatus 104 including a first shield part 202 exploded from the remainder of the camera apparatus 104 thereby uncovering a cathode ray tube (CRT) assembly 204 mounted on a support plate 206 which in turn is mounted on a mounting plate 208. The cathode ray tube assembly 204 is preferably a standard curved field CRT display 205. A suitable assembly that can be used for the cathode ray tube assembly 204 is commercially available from Dotronix, Inc. with offices in New Brighton, Me. under model number 900946-54. A channel shaped mount (not illustrated) is connected under the mounting plate 208 for riding on a bar rail or track 110 mounted on the system mainframe 175 when being inserted in the automatic daylight film handling apparatus 10.. An end of the mounting plate 208 is press fit in a clamping device 212 when the camera apparatus is fully inserted in the automatic daylight film handling apparatus 10. FIG. 2 further shows a second shield part 214 mounted to the mounting plate 208. Exploded from the second shield part 214 is a third tubular light shield 216 which interconnects the second shield part 214 with a plate 218 on which the film to be exposed with patient information is resting. An optical window 220 is in the plate 216 which allows light directed through an opening 222 through the shields 214 into and though the shield 216 to pass through the window 220 onto the film adjacent the window 220.

Figure 6:
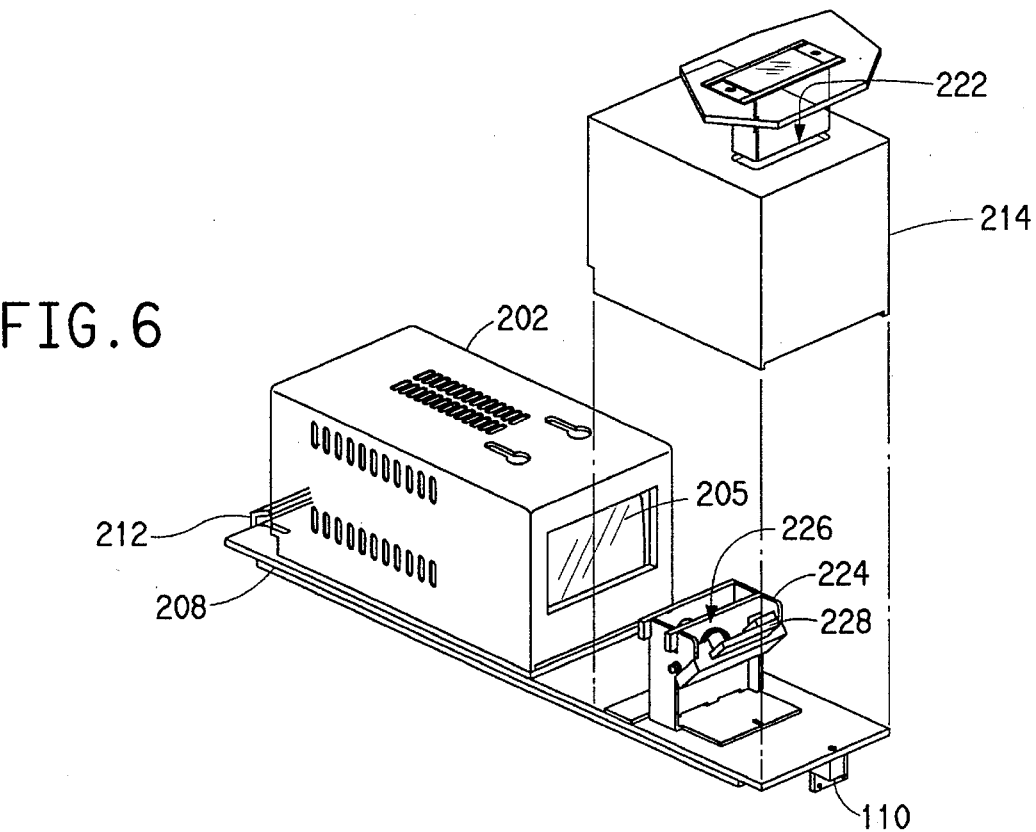
FIG. 6 is an enlarged partially exploded view of the camera apparatus including a cathode ray tube assembly, a second lens assembly and a reflector.
Figure 7:
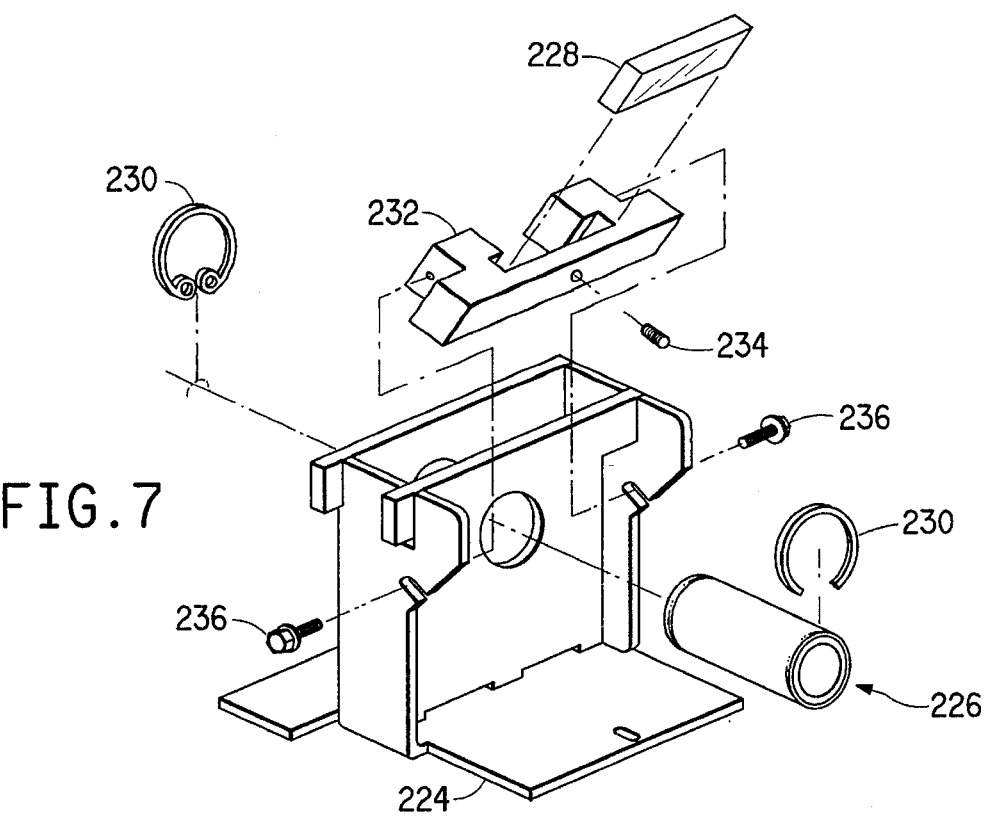
FIG. 7 is an enlarged partially exploded view of the second lens assembly and the reflector.

FIG. 6 is an enlarged view of the camera apparatus 104 including the second shield part 206 exploded from the remainder of the camera apparatus 104 thereby uncovering a support 224, a second lens assembly 226 and a reflector 228. Referring to FIG. 7, the second lens assembly 226 is cylindrical and held by snap rings 230 to the support 224. The second lens assembly 226 is a relay lens assembly which focuses an object image from the CRT display 205 onto the film. The mirror or reflector 228 is connected to a mirror holder 232 by a set screw 234. The mirror preferably is a first surface reflector. The mirror holder 232 is mounted to the support 224 by screws 236.

Figure 8:
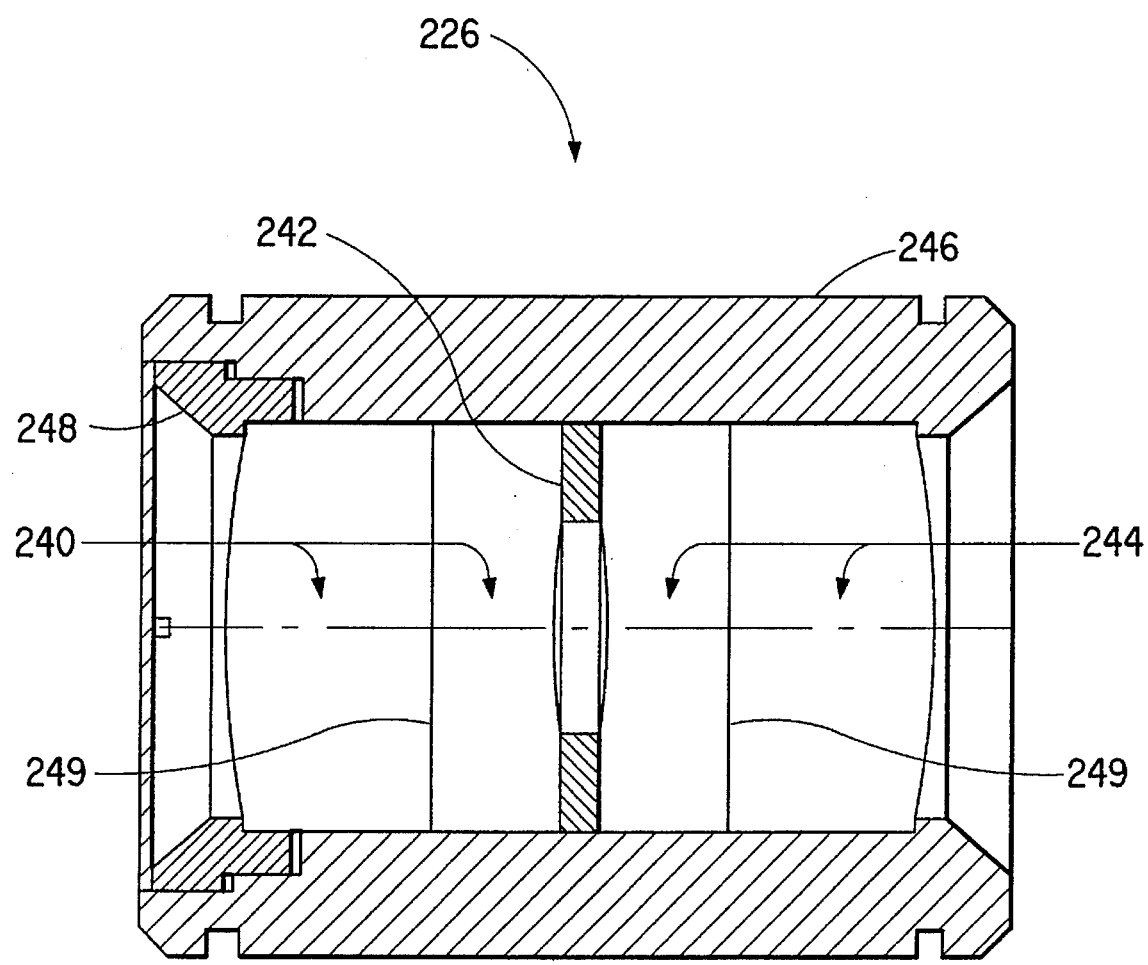
FIG. 8 is a cross sectional view of the second lens assembly.

FIG. 8 is a cross sectional view of the second lens assembly 226. Preferably, the second lens assembly 226 comprises a symmetrical doublet lens assembly. More specifically, preferably the second lens assembly 226 comprises a front doublet lens 240, a lens spacer 242 and a rear doublet lens 244 housed within a cylindrical bore in a cylindrical lens housing 246. A lens retainer 248 secures the front doublet lens 240 in contact with one side of the lens spacer 242 and the rear doublet lens 244 in contact with a distal side of the lens spacer within the bore of the lens housing 246. Each one of the front doublet lens 240 and the rear doublet lens 244 comprises a pair of lens that can be secured together, such as by an adhesive 249. Light from the CRT display 205 is directed and focused by the second lens assembly 226 by passing through, in order, the front doublet lens 240, a hollow space or aperture stop 250 in the lens spacer 242 and then the rear doublet lens 244 to the mirror 228 which reflects the light onto the film.

Figure 9:
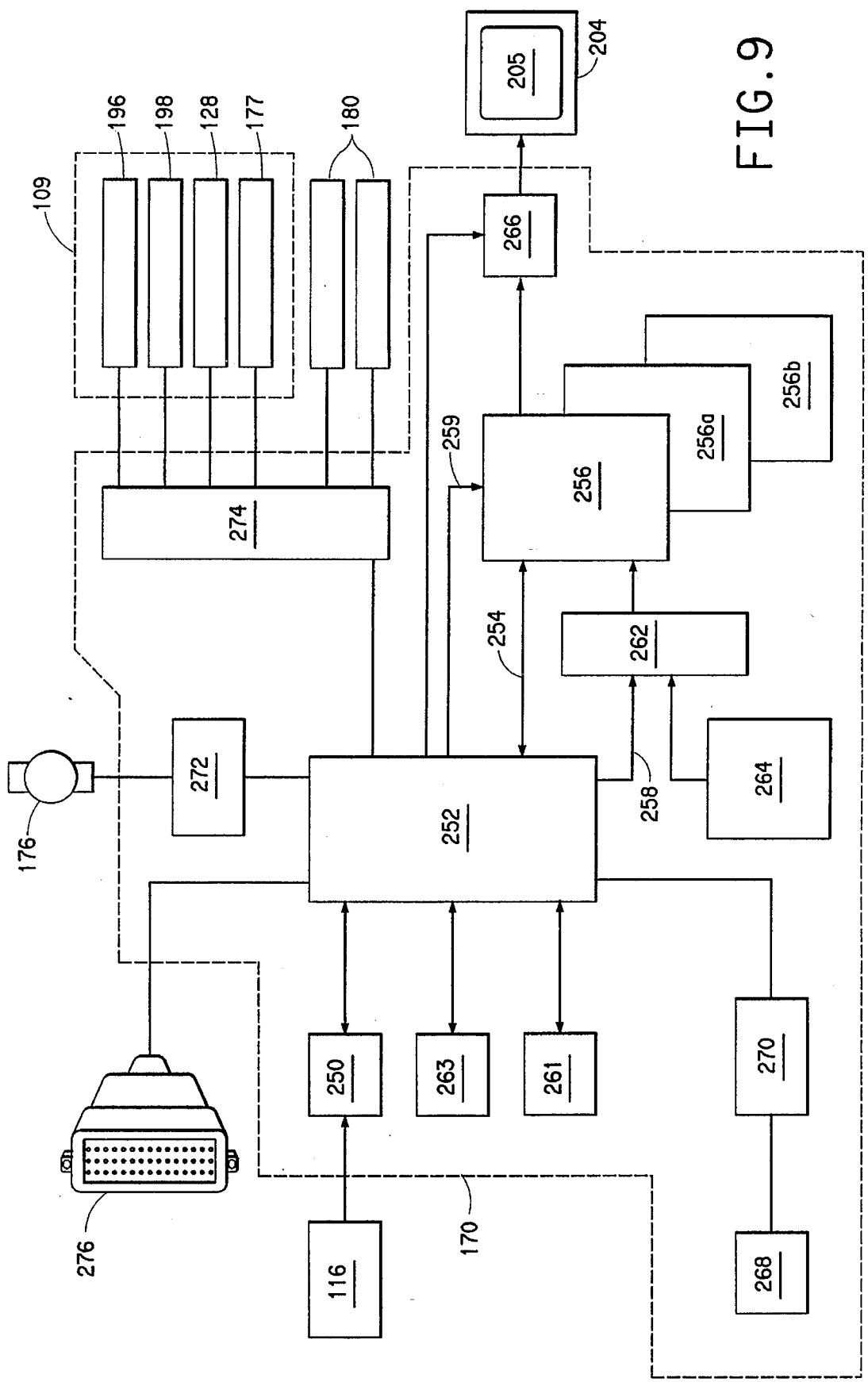
FIG. 9 is a functional block diagram showing the flow of signals generated by the sensor assembly of the scanner apparatus through the electronic control system to the CRT assembly.

FIG. 2 shows that the electronic control system 106 resides on a first printed circuit board 107 and a second printed circuit board 109. FIG. 9 is a functional block diagram showing the flow of signals generated by the sensor assembly 116 of the scanner apparatus 102 through the electronic control system 106 to the CRT assembly 204.

The sensor assembly 116 includes a CCD linear array which captures each line image of the scanning area on the card as the card is moved one step at a time under the sensor assembly 116 by the motor assembly 176. The motor assembly 176 is capable of moving the card 300 steps per inch resulting in 300 scan lines per inch. The sensor assembly 116 is capable of capturing 1024 picture elements or pixels for each line that is sensed (i.e., approximately 300 pixels per inch). One at a time, each captured picture element or pixel is shifted, amplified and sent by the sensor assembly 116 to an analog to digital (A/D) converter 250. The A/D converter converts the analog signals from the sensor assembly 116 to digital signals corresponding to a numeric value between and including 0 and 255.

The digital signals are directed to a central processing unit (CPU) assembly 252 that sends the digital signals over a data bus 254 for storage in a memory 256, such as a video random access memory (RAM). When the digital signals are sent to the memory 256, address information which specifies where to store the digital signals is sent from the CPU assembly 252 to the memory 256 over an address bus 258 and instructions on whether to read or write the information from or in the addressed location are sent over a read/write line 259. The CPU assembly 252 and the memory 256 will interact as is well known in the art of computer processing whereby the CPU assembly 252 will store the digital signals in the memory 256, read signals stored in the memory, manipulate and process the signals, and store new or the same values back in new or the same address locations in the memory for later use. A read only memory (ROM) 261 and a static random access memory (RAM) 263 are connected to the CPU assembly 252. The ROM stores system operating software and other programs which are used to direct the CPU assembly 252. Data is temporarily stored in the static RAM throughout the process and calculations directed by the programs.

When the CPU assembly 252 is not accessing the memory 256, a latch 262 allows a video controller 264 to send pixels stored in the memory 256 representing a scanned image to a digital to analog (D/A) converter 266 which converts the digital signals to analog signals for driving the CRT assembly 204. The CPU assembly 252 is also connected to the D/A converter 266 in a manner that maintains the CRT display 205 blank at all times except when a film is to be exposed. Reference numbers 256a and 256b illustrate that a plurality of images can be stored in the memory 256 at the same time by sequentially scanning different cards with different information, such as for different patients.

A manual reset switch 268 can be connected through a watch-dog timer circuit 270 that automatically restarts the CPU assembly 252 after power-up or a crash. A step motor controller assembly 272 interconnects the CPU assembly 252 with the motor assembly 176. Drivers and latches 274 interconnect the CPU assembly 252 with the manual scan control button 196, the AP/PA toggle switch 198, the card sensor 128, the universal card holder 108 sensor 177, and the pair of LED linear arrays 180. A serial communications interface connector 276 terminates a line from the CPU assembly 252 for interconnecting to a terminal or a computer, such as the microcomputer of the automatic daylight film handling apparatus 10.

The image data stored in the memory 256 can be accessed by a remote computer system (not shown) through the interface connector 276. The remote computer system can be programmed to perform other operations on the image data, such as a character or bar code recognition operation. The remote computer system can be connected to an output device, such as a laser imager, for placing patient information on medical recording films other than X-ray films.

Pertinent lines from an illustrative software embodiment for use by the present invention is included in an Appendix A to this specification. The software program is written in the 680X0 Assembly language for the 68000 processor and appears immediately before the claims.

The electronic patient information imaging assembly 100 of the present invention is programmed to enable the CPU assembly 252 to perform image manipulation operations such as white balance, gray adjust, positive/negative image, text addition, border addition, image rotation and image inversion on image data stored in the memory 256,256a, 256b. The electronic patient information imaging assembly 100 of the present invention is capable of performing any one or any combination of these operations on any image data stored in the memory 256,256a,256b. No prior art automatic X-ray film handling system which includes a direct imaging camera within the system is capable of performing any of these image manipulation operations.

The white balance operation compensates for nonuniformity between the CCD sensor elements in the sensor assembly 116. CCD nonuniformity is due to electrical variations between different cells of the array and variations in light intensity between cells. A substantially white card is scanned. The white balance operation creates a correction table in memory based on the scan data of the white card. This table is used by a correction algorithm to modify the scan data after future scans. A suitable white balance algorithm that can be used is as follows:

$$AP(i)=DL-RP(i)*(DL-WL)/(DL-WA(i))$$

where

DL=darkest pixel level or value,

WL=whitest pixel level or value,

RP=raw (unmodified) pixel value,

WA(i)=white adjust "correction" coefficient from table for given pixel, and

AP(i)=adjusted pixel value.

Lines 1–111 and 430–539 of the attached software listing provide a preferred embodiment for implementing the white balance operation.

The gray adjust operation is a means of mapping a range of input grey levels or values to a different set of output grey values to expand or compress the range of the input values. For instance, a typical ID card is scanned. Assuming the total actual range of input values sensed from the typical card was from 60 to 200. The CPU would generate a look-up table of coefficients that can be used to expand the input values of that typical card and subsequent cards with similar input ranges to an output range of 0–255. This is useful because different hospital ID cards contain variations in print densities and background color. By performing the grey adjust procedure, the CPU assembly 252 will determine the extent to which it can change the contrast of the image to enhance the image on the CRT display 205. This assures repeatable image quality when the processed image data is exposed on the X-ray film. Lines 112–345 and 503–525 of the attached software listing provide a preferred embodiment for implementing the gray adjust operation.

The image positive/negative image operation utilizes the inverse of the look-up table of coefficients generated for the gray adjust operation to make a positive image from a negative original. This operation allows the operator to choose whether the patient information imaged on the film will be a negative image or a positive image. Lines 508–525 of the attached software listing provide a preferred embodiment for implementing the image positive/negative image operation.

The text addition operation allows ACSII text information to be added to a processed image to provided additional information, such as, the date and time. This is accomplished by the operator inserting the date and time through the operator interface 192. The operator can specify the row and column in the display field to specify the location of the additional information. The operator can select from a plurality of sizes, fonts and formats for the additional information. A character table is stored for each character in a plurality of sizes and fonts. If a character recognition program is included, the operator can also select from a plurality of sizes, fonts and formats for displaying the information scanned from the patient ID card. Lines 656–770 of the attached software listing provide a preferred embodiment for implementing the text addition operation. The CPU assembly 252 can be connected with other computer patient information databases and/or other input devices, such as optical bar code scanners or magnetic card readers to provide additional information to be imaged onto the film.

The border addition operation allows the operator to add a template of information to the scanned information, rather than requiring standard information to be printed on the ID card. The template can include information, such as hospital name, hospital address, decorative borders, etc. Lines 492–502 of the attached software listing provide a preferred embodiment for implementing the border addition operation.

The image rotation operation is a digital operation that allows an operator to ensure that the patient information image placed on the X-ray film is always "right reading" or readable by a radiologist, i.e., not backwards or a mirror image, when the radiograph is positioned as the radiologist is accustomed. To elaborate, a patient may be facing towards or away from an X-ray source when the patient is exposed to the X-rays. Further, a radiologist may prefer to look at a radiograph as if the patient was facing towards or away from the radiologist. For instance, if the radiologist was accustomed to viewing a radiograph as if the patient was facing the radiologist, then the patient information must be imaged onto the film such that it is right reading or readable when viewed as if the patient was facing the radiologist, regardless of whether the patient was facing towards or away from the X-ray source when the patient is exposed to the X-rays. The toggle switch 198 controls this choice. In one position, the toggle switch 198 allows the CPU assembly 252 to cause the scanned image to be read from the memory 256 left to right in driving the CRT assembly 204. In the other position, the toggle switch 198 causes the scanned image to be read from the memory 256 right to left, rather than left to right, in driving the CRT assembly 204. In contrast with prior art systems, the electronic patient information imaging assembly 100 of the present invention digitally performs this operation on information scanned from cards placed in only one card holder 108 conveniently located on the front side of the automatic daylight film handling apparatus 10. Lines 596–650 of the attached software listing provide a preferred embodiment for implementing the image rotation operation.

The image inversion operation allows patient information to be imaged in a right reading fashion onto the lower half, such as the bottom, of a radiograph. When an X-ray cassette is used with a lead blocker blocking an upper left corner area of a sheet of film in the cassette, the cassette can be rotated 180 degrees such that the blocker is in the lower right corner. With the cassette in this position the patient and then the cassette is exposed to X-rays (rather than exposing the patient and cassette to X-rays with the blocked area on the upper left corner of the cassette). Then the cassette is inserted into the automatic daylight film handling apparatus 10 with the blocker positioned towards the right insertion end of the cassette. The operator selects the image inversion operation through the operator interface which places the scanned information on the bottom right corner of the radiograph in a right reading fashion. Selection of this operation causes the CPU to read the scanned image stored in the memory 256 one scan line at a time right to left and from bottom to top, rather than from left to right and from top to bottom. If the blocker was originally on the upper right corner of the cassette, rotating the cassette 180 degrees causes the blocker to be on the lower left corner. In this case, after (1) exposure to X-rays, (2) insertion into the automatic daylight film handling apparatus 10 with the blocker positioned towards the right insertion end of the cassette, and (3) selection of the image inversion operation by the operator, the patient information scanned from a card will be imaged on a lower left corner of the radiograph in a right reading fashion. Lines 596–650 of the attached software listing provide a preferred embodiment for implementing the image inversion operation.

Figures 10A, 10B, 10C:
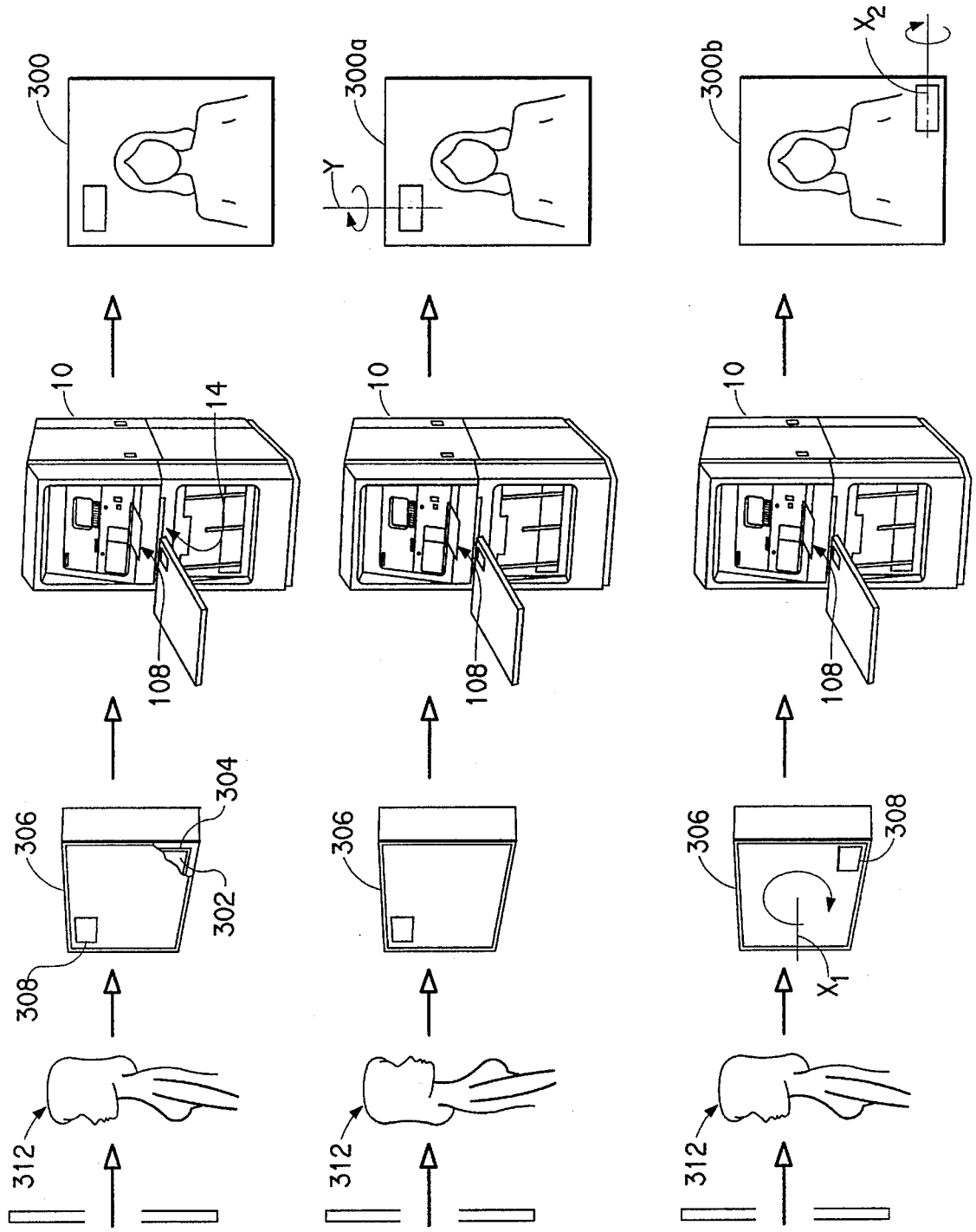
FIG. 10a schematically illustrates a process for preparing a radiograph where a patient is facing an X-ray source in an exposure step in accordance with the present invention.
FIG. 10b schematically illustrates a process for preparing a radiograph where a patient is facing away from an X-ray source in an exposure step in accordance with the present invention.
FIG. 10c schematically illustrates a process for preparing a radiograph where patient information is imaged onto a bottom half of a previously unexposed area of an X-ray film in accordance with the present invention.

FIG. 10a schematically illustrates a process for preparing a radiograph 300 in accordance with the present invention. The first step of the process comprises placing an X-ray film 302 against at least one X-ray intensifying screen 304 in a cassette 306 with an X-ray blocker 308 covering at least one area of the film. The cassette 306 can be any light tight X-ray cassette that can be used to hold a sheet of X-ray film 302 during exposure to X-ray radiation whereby light is released or generated within the cassette 306, by causing the enclosed screen 304 to fluoresce, as a result of the X-ray radiation to aid in the exposure of the enclosed X-ray film 302. Illustrative cassettes 306 that can be used in the present invention are disclosed in U.S. Pat. Nos. 4,479,232; 4,408,340; 4,380,087; 4,350,248; 4,339,038; 4,264,821; 4,259,586; 4,194,625; 4,166,958; 4,157,474; 4,081,686; 4,032,790; 4,013,890; 3,958,125; 3,884,818; 3,883,746; 3,504,180; and 3,153,145.

A second step of the process comprises exposing the screens 304 and film 302 to X-rays from an X-ray source 110 which have passed through a patient 312 leaving the blocked area unexposed. The patient 312 can be facing towards the X-ray source 310 as illustrated in FIG. 12a or facing away from the X-ray source 310 during this step as illustrated in FIG. 12b.

A third step of the process comprises inserting the cassette 306 with the exposed film 302 in it in the entrance slot 14 of the automatic daylight film handling apparatus 10. The automatic daylight film handling apparatus 10 is designed to always receive the cassette 306 with the cassette in the same orientation, i.e., so that the cassette can be opened in the same manner by the cassette opening-closing assembly 22.

A fourth step of the process comprises scanning information about the patient 312 from a patient information card held in a universal card holder 108. This fourth step can be performed before or after the third step of inserting.

A fifth step of the process is processing the scanned information.

A sixth step of the process is imaging the processed information onto the previously unexposed area of the film 302 such that the imaged information is right reading. The automatic daylight film handling apparatus 10 is preferably designed to image patient information on an area of the film in the leading right insertion corner of the sheet of film.

FIG. 10b schematically illustrates the situation where the patient 312 is facing away from the X-ray source during the exposure step. In this situation, the image rotation operation as previously described is performed on the scanned information during the processing step. Specifically, the scanned image is rotated 180 degrees about the Y axis during the processing step before imaging the processed image onto the radiograph 300a.

FIG. 10c schematically illustrates the process described above except during the exposing step, the blocked area is positioned in the bottom half of the film. In other words, the cassette 306 is rotated 180 degrees about an axis $X_1$ before the exposure step locating the blocker 308 in the bottom half of the film. Then during the processing step, an image inversion operation as previously described is performed on the scanned information. This operation inverts the scanned image (or rotates the image 180 degrees about an axis $X_2$. Then the imaging step places the processed information on the previously unexposed area right reading and rightside up in the bottom half of the radiograph.

Those skilled in the art, having the benefit of the teachings of the present invention as hereinabove set forth, can effect numerous modifications thereto. These modifications are to be construed as being encompassed within the scope of the present invention as set forth in the appended claims.

A-1

APPENDIX A

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Proprietary Notice: This Software is the property of E. I. du Pont de Nemours and Co. with offices at Wilmington, Delaware. The program, listing, binary and executable files are proprietary and may not be cistributed or copied for non-Du Pont use without the express written approval of Du Pont.

Copyright Notice: Copyright November 21, 1991 by E. I. du Pont de Nemours and Co.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* \*\*\*\*\*

```
1.   ;
2.   ;
3.   ; Name:
4.   ; ReadWhiteAdjust
5.   ;
6.   ; Description:
7.   ; This routine is called to read a screen from the CCD
8.   ;     and generate a new white adjust array.

9.        ReadWhiteAdjust:
10.            MOVE.L    D0,-(A7)         ; Save
11.            MOVE.L    D1,-(A7)         ;    the
12.            MOVE.L    D2,-(A7)         ;        registers
13.            MOVE.L    D3,-(A7)         ;
14.            MOVE.L    D4,-(A7)         ;
15.            MOVE.L    A0,-(A7)         ;
16.            MOVE.L    A1,-(A7)         ;
17.            MOVE.L    A2,-(A7)         ;
18.            MOVE.L    A3,-(A7)         ;

19.            MOVE.B    #St_Calibrate,D0 ; Change state to calibrating
20.            BSR   SetStatus
21.            BSR   ClearWhiteAdjust     ; Clear the array...
22.            BSR   MoveToWindow         ; Move tray to window
23.            BSR   LightBarOn           ; Lights!
24.            CLR.L D2
25.            CLR.L D5
26.            MOVE.W    #CCD_Lines,D2    ; Initialize the line counter (D2)
27.            LEA.L CCD_Data.L,A3        ; Point to the CCD data port
28.            BSR   SkipLine
29.            MOVE.B  #SkipLines,D5
30.            ADD.W D5,D2                ; Add extra skip lines
31.            ASR.B #1,D5                ; Divide by two
32.            CLR.L D3                   ; D3 will hold the dark value
33.       ; startup scanner motor
34.            MOVE.W D2,LineCount.L      ; Load Line Count
35.            ADDI.W #2,LineCount.L      ; give motor head start
36.            MOVE.W ACount.L,D0
37.            MOVE.B D0,TADR.L
38.            BSR StartTrayIn            ; set for forward move
39.            MOVE.W Aprescale.L,D0      ; get Timer A prescale
40.            MOVE.B D0,TACR.L   ; load into control register to   ; enable timer
41.            BSET.B #5,IERA.L   ; Enable Timer A interrupt (unmask   ; it later on)
42.            BSET.B #5,IMRA.L                      ; unmask interrupt to start stepping
```

A-2

```
43.     RW_NextLine:
44.         BSR    StartScan                  ; Sample a line...
45.         ; Skip first lines
46.         CMPI.B   #0,D5                    ; skip first lines?
47.         BEQ.S    RW_GetData               ; no, get line data, else ...
48.         SUBI.B   #1,D5
49.         BSR      SkipLine                 ; line line but dont store data
50.         BRA      RW_DoneLine              ; done skipping line
51.     RW_GetData:
52.         ; Record the first 32 dummy pixels as a dark level...
53.         MOVE.W   #32,D1                   ; Initialize the byte counter
54.         CLR.L    D0                       ; Clear D0 to read into
55.         CLR.L    D4                       ; Clear D4 to accumulate
56.     RW_ReadDark:
57.         MOVE.B   (A3),D0                  ; Get the CCD byte
58.         ADD.L    D0,D4                    ; Accumulate the value
59.         DBF      D1,RW_ReadDark           ; If more bytes, loop again 60.         ASR.L    #5,D4                    ; divide by 32   val in [0-256]
61.         ADD.L    D4,D3                    ; Accumulate column total 62.         ; Skip the balance of the unused pixels...
63.         MOVE.W   #CCD_Prolog-32,D1        ; Initialize the byte counter
64.     RW_Skipping:
65.         TST.B    (A3)                     ; Get the CCD byte
66.         DBF      D1,RW_Skipping           ; If more bytes, loop again 67.         ; Read the real data pixels...
68.         MOVE.W   #PixelsPerRow,D1         ; Initialize the byte counter (D1)
69.         LEA.L    WhiteAdjust.L,A2         ; Point to offset array 70.     RW_Load:
71.         ; This loop reads a line from the CCD, summing adjacent bytes
72.         CLR.L    D0                       ; D0 starts as zero
73.         MOVE.B   (A3),D0                  ; Get the first CCD byte of the pair
74.         TST.B    (A3)                     ; Forget the second CCD pixel
75.         ADD.L    D0,(A2)+                 ; Add to the offset array
76.         DBF      D1,RW_Load               ; If more bytes, loop again
77.         BSET.B   #Scanning,GPIP.L         ; Clear the scanning line.
78.     RW_DoneLine:
79.         SUBI.L   #2,D2                    ; decr by 2 since we skip alternate lines
80.         BNE      RW_NextLine              ; go read next line
81.         BSR      LightBarOff              ; Lights down.

82.         ; Compute the average column intensity over all rows
83.         MOVE.W   #PixelsPerRow,D1         ; Number of elements
84.         LEA.L    WhiteAdjust.L,A2         ; Address of array
85.         MOVE.L   #255,D2                  ; Initialize to find minimum 86.     RW_Average:
87.         MOVE.L   (A2),D0                  ; Get the column sum
88.         DIVU.W   #CCD_Lines/2,D0          ; Divide by the line count
89.         EXT.L    D0                       ; Extend the quotient
90.         MOVE.L   D0,(A2)+                 ; Store back over sum
91.         CMP.L    D0,D2                    ; Compare to current minimum
92.         BLT      RW_Continue              ; Continue if greater
93.         MOVE.L   D0,D2                    ; Store new minimum
```

A-3

```
94.         RW_Continue:
95.             DBF     D1,RW_Average           ; Loop if more columns
96.             MOVE.W  D2,WhiteLevel.L         ; Save the minimum as white level
97.         ; Compute the average dark value per row...
98.             DIVU.W  #CCD_Lines/2,D3         ; Divide by line count
99.             MOVE.W  D3,DarkLevel.L          ; Save
100.            BSET.B  #DidWhiteAdj,MiscFlags.L; Set the flag that it was done.

101.            MOVEA.L (A7)+,A3                ; Restore the registers
102.            MOVEA.L (A7)+,A2                ;
103.            MOVEA.L (A7)+,A1                ;
104.            MOVEA.L (A7)+,A0                ;
105.            MOVE.L  (A7)+,D4                ;
106.            MOVE.L  (A7)+,D3                ;
107.            MOVE.L  (A7)+,D2                ;
108.            MOVE.L  (A7)+,D1                ;
109.            MOVE.L  (A7)+,D0                ;
110.            RTS
111.        ;   ----------------------

112.        ;=PROCEDURE=====================JJFISHER=================;
113.        ;                                                        ;
114.        ;   Name:                                                ;
115.        ;   LoadLuts                                             ;
116.        ;                                                        ;
117.        ;   Description:                                         ;
118.        ;       Load the normal and inverse Lookup Tables (LUTs).;
119.        ;       The two tables allow normal and inverse video grey;
120.        ;       scale images to be created.                      ;
121.        ;       The tables are created by giving a input and output;
122.        ;       range values shown below. The input range should be the;
123.        ;       maximum and minimum pixel values obtained from the;
124.        ;       CCD. These are determined by scanning a typical card with;
125.        ;       the "IG" command.                                ;
126.        ;       The ouput range is the desired grey range the input;
127.        ;       values should be mapped to. This range is varied ;
128.        ;       to obtain the best image on the CRT. Ideally this;
129.        ;       range should be 0-FF but depending the response of;
130.        ;       the CRT.                                         ;
131.        ;                                                        ;
132.        ;
133.        ;                   _____     _____
134.        ;                   |         |     |         |          Theory of operation: The
135.        ;                   | invalid |     | invalid |          lookup tables LUT and ILUT
136.        ; LIHigh            |_____|     |_____|            take input grey pixel values
137.        ;                   | LOHigh  |     | LOLow   |          from the CCD scanner, which
138.        ;                   |         |     |         |          have a limited range, and
139.        ;                   | "valid" |     | "valid" |          remap them to another range
140.        ;                   |         |     |         |          which will be displayed on
141.        ;                   | LOLow   |     | LOHigh  |          the CRT monitor.
142.        ; LILow             |---------|     |---------|
143.        ;                   | invalid |     | invalid |
144.        ;                   |_____|     |_____|
145.        ;                     LUT             ILUT
146.        ;
147.        ;
```

A-4

```
148.            ; The following variables must be initialized
149.            ; prior to running this subroutine:
150.               ; LIHigh  : Lookuptable Input High value determined from scan of typical card
151.               ; LILow   : Lookuptable Input Low value determined from scan of typical card
152.            ; LOHigh  : Lookuptable Output High value
153.            ; LOLow   : Lookuptable Output Low value
154.            ;
155. ;==============================================================;

156.     LoadLuts:
157.            MOVE.L  D1,-(A7)
158.            MOVE.L  D2,-(A7)
159.            MOVE.L  D3,-(A7)
160.            MOVE.L  A0,-(A7)
161.            MOVE.L  A1,-(A7)
162.            MOVE.L  A2,-(A7)

163.            MOVE.W  LILow.L,D0
164.            MOVE.W  LOLow.L,D1
165.            SUB.W   D0,D1
166.            MOVE.W  D1,LUTOfs.L      ; LutOutputLow value -LutInputLow value
167.            MOVE.W  LIHigh.L,D0      ; get LutInputHigh value
168.            MOVE.W  LILow.L,D1       ; get LutInputLow value
169.            SUB.W   D1,D0            ;   LutInputHigh-LutInputLow
170.            BLE     LUTerr           ; error if range is <= zero
171.            MOVE.W  D0,LIRange.L     ; store as LutInputRange
172.            MOVE.W  LOHigh.L,D0
173.            MOVE.W  LOLow.L,D1
174.            SUB.W   D1,D0
175.            BLE     LUTerr           ; error if range is <= zero
176.            MOVE.W  D0,LORange.L
177.            CLR.L   D0
178.            CLR.L   D1
179.            MOVE.W  LORange.L,D0
180.            MOVE.W  LIRange.L,D1
181.            DIVU.W  D1,D0
182.            MOVE.W  D0,LDiv.L
183.            SWAP.W  D0
184.            MOVE.W  D0,LRem.L
185.     ; set out of range values in table
186.            LEA.L   LUT.L,A0         ; start addr of LUT
187.            LEA.L   ILUT.L,A2        ; start addr of ILUT
188.            CLR.L   D0
189.            MOVE.W  LILow.L,D0       ; offset to first value
190.            MOVEA.L A0,A1
191.            ADDA.L  D0,A1            ; starting address of valid ranges
192.            MOVE.L  A1,D0

193.     LLoop1:
194.            CMPA.L  A0,A1            ; fill complete?
195.            BEQ.S   LInit1           ; yes? exit ; no? set pixel value
196.            MOVE.W  LOLow.L,D0
197.            MOVE.B  D0,(A0)+         ; set invalid low range in LUT
198.            MOVE.W  LOHigh.L,D0
199.            MOVE.B  D0,(A2)+           ; set invalid high range in ILUT
200.            BRA.S   LLoop1
```

A-5

```
201.        LInit1:
202.            LEA.L ILUT.L,A1
203.            LEA.L LUT.L,A0
204.            LEA.L ILUT.L,A2
205.            CLR.L D0
206.            MOVE.W LIHigh.L,D0
207.            ADDA.L D0,A0              ; set to valid top of LUT
208.            ADDA.L D0,A2              ; set to valid top of ILUT
209.        LLoop2:
210.            CMPA.L A0,A1
211.            BEQ.S LLoadR
212.            MOVE.W LOHigh.L,D0
213.            MOVE.B D0,(A0)+           ; set invalid high range of LUT
214.            MOVE.W LOLow.L,D0
215.            MOVE.B D0,(A2)+           ; set invalid low range of ILUT
216.            BRA.S LLoop2

217.        ; generate range values
218.        LLoadR:
219.            CLR.L D0
220.            MOVE.W LILow.L,D0         ; offset to low input value
221.            LEA.L LUT.L,A0            ; make starting address
222.            ADDA.L D0,A0
223.            LEA.L ILUT.L,A1           ; starting address for ILUT
224.            MOVE.W LIHigh.L,D0        ; offset in input high value
225.            ADDA.L D0,A1              ; for ILUT
226.            MOVE.W LOLow.L,D0         ; first pixel value
227.             MOVE.W LIRange.L,D3      ;  counter
228.            MOVE.W LDiv.L,D1
229.            MOVE.W LRem.L,D2          ; Rem counter
230.        LILoop:
231.            MOVE.B D0,(A0)+           ; Load LUT value
232.            MOVE.B D0,-(A1)           ; Load ILUT value
233.            ADD.W LDiv.L,D0           ; Add integer step to pixel value
234.            ADD.W LRem.L,D2           ; Add fractional step part
235.            CLR.L D1                  ; Clear High word for next divide
236.            MOVE.W D2,D1              ; Load working register
237.            DIVU.W LIRange.L,D1       ; get carry value and new fraction
238.            ADD.W D1,D0               ; add carry integer -may be zero
239.            SWAP.W D1                 ; position new fractional part
240.            MOVE.W D1,D2              ; save as new fraction
241.            SUBI.W #1,D3
242.            BNE.S LILoop
243.            MOVE.W #LUTValid,InvVid.L    ; declare LUTS valid but not selected
244.            BRA.S LUTend                 ; Call it done
245.        LUTerr:
246.          MOVE.W #LUTOff,InvVid.L
247.        LUTend:
248.            MOVEA.L (A7)+,A2
249.            MOVEA.L (A7)+,A1
250.            MOVEA.L (A7)+,A0
251.           ·MOVE.L (A7)+,D3
252.            MOVE.L (A7)+,D2
253.            MOVE.L (A7)+,D1
254.            RTS

255.        ;----------------;
```

A-6

```
256.    ;=PROCEDURE=================================JJFISHER=======
257.    ;                                                          ;
258.    ; Name:                                                    ;
259.    ;     ReadGreyRange                                        ;
260.    ;                                                          ;
261.    ; Description:                                             ;
262.    ;     This routine is called to read a screen image from the CCD  ;
263.    ;     and determine the grey ranges necessary to from the grey lookup tables.  ;
264.    ;==========================================================;

265.    ReadGreyRange:
266.        MOVE.L    D0,-(A7)         ; Save
267.        MOVE.L    D1,-(A7)         ;   the
268.        MOVE.L    D2,-(A7)         ;     registers
269.        MOVE.L    D3,-(A7)         ;
270.        MOVE.L    D4,-(A7)         ;
271.        MOVE.L    D5,-(A7)         ;
272.        MOVE.L    A0,-(A7)         ;

273.        MOVE.B    #St_Calibrate,D0 ; Change state to scanning
274.        BSR   SetStatus 275.        LEA.L Scan_Base.L,A0       ; get start of image memory
276.        ADDA.L #PixelsPerRow*15,A0 ; index into image -61e00h
277.        CLR.L D2
278.        MOVE.W    #CCD_Lines/2,D2  ; Initialize the line counter (D2) 150
279.        SUBI.W #15,D2              ; stay away from bottom           135
280.        CLR.L D3                   ; our pixel value counter
281.        MOVE.L #0,D4     ; reg will hold lightest value, initialize low
282.        MOVE.L #255,D5   ; reg will hold darkestest value, initialize high
283.        CLR.L D1
284.    RG_NextLine:
285.        ; Read the pixels data 286.        MOVE.W    #PixelsPerRow,D1 ; Initialize the byte counter (D1) 512
287.        SUBI.W #20,D1
288.    ADDA.L #10,A0                  ; index away from edges
289.    RG_Load:
290.        CLR.L D0                   ; D0 starts as zero
291.        MOVE.B (A0)+,D0
292.        ADD.L     D0,D3            ; Add to cumulative counter
293.        CMP.W D4,D0                ; check for max range value
294.        BPL.S RG_SetMax            ; set value if found
295.        CMP.W D5,D0                ; check for minimum range value
296.        BLT.S RG_SetMin            ; set value if found
297.        BRA.S RG_Cont
298.    RG_SetMax:
299.        MOVE.L D0,D4               ; set a new maximum
300.        BRA.S RG_Cont
301.    RG_SetMin:
302.        MOVE.L D0,D5               ; set a new minimum
303.    RG_Cont:
304.        SUB.W #1,D1
305.        BNE.S RG_Load              ; get another pixel if line not complete?
306.        ADDA.L #10,A0              ; skip to end of line
307.        SUB.W #1,D2
308.        BNE.S RG_NextLine
```

A-7

```
309.              ; Determine if grey range has already been set. If so then
310.              ; see if new range values are higher or lower then previous
311.              ; ones and set new values accordingly. If the grey
312.              ; range has not been set then keep most recently found values
313.              ; as the range.

314.                      ANDI.L  #0FFH,D4              ; make sure high order bytes are clear
315.                      ANDI.L  #0FFH,D5              ;           dito
316.                      CLR.L   D0
317.                      BRA     RG_SetHL
318.                      CMP.W   LIHigh.L,D4           ; is new light value higher then stored?
319.                      BGT.S   RG_SetH               ; Yes? : store new value
320.              RG_SetCont:
321.                      CMP.W   LILow.L,D5            ; is new dark value lower then stored?
322.                      BLT.S   RG_SetL               ; Yes? : store new value
323.              RG_SetH:
324.                      MOVE.W  D4,LIHigh.L           ; Set new light range value
325.                      BRA.S   RG_SetCont
326.              RG_SetL:
327.                    MOVE.W   D5,LILow.L             ; Set new dark range value
328.                      BRA.S   RG_LUT
329.              RG_SetHL:
330.                      MOVE.W  D4,LIHigh.L           ; Set high range value
331.                      MOVE.W  D5,LILow.L            ; Set low range value 332.              RG_LUT:
333.                      BSR     ClearLuts             ; Clear Lookup Table for new calculation 334.              ;       MOVE.L #ABCDH,D0
335.              ;       BSR DumpReg 336.                      BSR     LoadLuts              ; Recalculate Lookup Table 337.                      MOVEA.L   (A7)+,A0            ; Restore the registers
338.                      MOVE.L  (A7)+,D5              ;
339.                      MOVE.L    (A7)+,D4            ;
340.                      MOVE.L    (A7)+,D3            ;
341.                      MOVE.L    (A7)+,D2            ;
342.                      MOVE.L    (A7)+,D1            ;
343.                      MOVE.L    (A7)+,D0            ;
344.                      RTS
345.              ;       ------------------------

346.      ;=PROCEDURE=====================================JFISHER=======;
347.      ;                                                             ;
348.        ; Name:                                                     ;
349.        ;    ReadCCD                                                ;
350.        ;                                                           ;
351.        ; Description:                                              ;
352.        ;    This routine is called to initiate the transfer of one ;
353.            ;   screen from the CCD into video memory and then to apply a white balance ;
354.            and grey lookup table                                   ;
355.        ;                                                           ;
```

A-8

```
356.            ; Parameters:
357.            ;    None
358.            ;
359.            ; Returns:
360.            ;    Void
361.            ;
362.            ; Algorithm:
363.            ;    N/A
364.            ;
365.            ;===========================================================;

366.    ReadCCD:
367.            MOVE.L      D0,-(A7)        ; Save
368.            MOVE.L      D1,-(A7)        ;   the
369.            MOVE.L      D2,-(A7)        ;     registers
370.            MOVE.L      D3,-(A7)        ;
371.            MOVE.L      D4,-(A7)        ;
372.            MOVE.L      D5,-(A7)        ;
373.            MOVE.L      D6,-(A7)        ;
374.            MOVE.L      A0,-(A7)        ;
375.            MOVE.L      A1,-(A7)        ;
376.            MOVE.L      A2,-(A7)        ;
377.            MOVE.L      A3,-(A7)        ;

378.            MOVE.B      #St_Scanning,D0 ; Change state to scanning
379.            BSR   SetStatus 380.            BSR   MoveToWindow          ; Move tray to window
381.            BSR   LightBarOn            ; Lights!
382.            ; Setup for scan...
383.            CLR.L D2
384.            LEA.L Scan_Base.L,A1        ; Initialize the data pointer (A1)
385.            MOVE.W      #CCD_Lines,D2   ; Initialize the line counter (D2)
386.            LEA.L CCD_Data.L,A3         ; Point to CCD data port
387.            BSR   SkipLine              ; forget first exposure
388.            CLR.L D5
389.            MOVE.B #SkipLines,D5        ; Get number of lines to skip
390.            ADD.W D5,D2                 ; Add skip lines to total scan lines 391.            ; Startup the scanner motor
392.            MOVE.W  D2,LineCount.L      ; Load Line Count
393.            ADDI.W  #2,LineCount.L      ; give motor head start
394.            MOVE.W  ACount.L,D0         ;
395.            MOVE.B  D0,TADR.L           ;
396.            BSR  StartTrayIn            ; set for forward move
397.            MOVE.W  Aprescale.L,D0      ; get Timer A prescale
398.            MOVE.B  D0,TACR.L           ; load into control register to enable timer 399.            BSET.B  #5,IERA.L           ; Enable Timer A interrupt (unmask it later on)

400.            BSET.B  #5,IMRA.L           ; enable interrupt to start stepping 401.    RCCD_NextLine:
402.            ; Scan one line...
403.            BSR   StartScan    ; Syncronize scanner to stepper and begin sampling
404.            BSR   SkipProlog              ; Skip the dummy pixels
405.            MOVE.W      #PixelsPerRow,D1 ; Initialize the byte counter (D1)
406.            MOVEA.L     A1,A0            ; Copy line pointer
```

A-9

```
407.    RCCD_Load:
408.        ;   This loop reads a scan line into memory
409.            CLR.L D0                        ; Zero D0
410.            MOVE.B      (A3),D0             ; Get the CCD byte
411.            TST.B (A3)                      ; throw out the next
412.            MOVE.B D0,(A0)+
413.            DBF    D1,RCCD_Load             ; If more bytes, loop again
414.        ; Scan complete for one line...
415.            BSET.B  #Scanning,GPIP.L        ; Clear scanning line - begin next integration
416.            SUBI.L #1,D2                    ; Decrement line counter to skip alternate line
417.                                            ;    in Scaner Interrupt routine
418.        ; Setup for next line...
419.            CMPI.B #0,D5                    ; Are these the first lines ?
420.            BEQ.S RCCD_NextL                ; yes, then start collecting data
421.            SUBI.B #1,D5                    ; no, decrement
422.            BRA RCCD_NextLine               ; go read next line
423.    RCCD_NextL:
424.        ;  Setup for next line...
425.            LEA.L PixelsPerRow(A1),A1       ; Index to the next line
426.            SUBI.W #1,D2
427.            BGT RCCD_NextLine
428.            BSR    LightBarOff              ; Lights down.
429.            BSR    MoveToCardSensor         ; Position for a card check 430.        ; Adjust the data...
431.            LEA.L Scan_Base.L,A1            ; Initialize the data pointer (A1)
432.            CLR.L D2
433.            MOVE.W      #CCD_Lines/2,D2     ; Initialize the line counter (D2)
434.    RCCD_AdjustLine:
435.            MOVE.W      #PixelsPerRow,D1    ; Initialize the byte counter (D1)
436.            MOVEA.L     A1,A0               ; Copy line pointer
437.            MOVE.W      D2,D6               ; Get the line counter
438.            ASR.W       #1,D6               ; Break into line regions
439.            ANDI.W      #0FFFEH,D6          ; Mask to a word boundary
440.            LEA.L VerticalAdjust.L,A2       ; Point to the vertical adjust table
441.            MOVE.W      0(A2,D6.W),D6       ; Get the factor for this line
442.            LEA.L WhiteAdjust.L,A2          ; Point to adjust array 443.    RCCD_AdjustBytes:

444.            CLR.L D0                        ; Be sure D0 is clear
445.            MOVE.B      (A0),D0             ; Get the raw pixel from the last line
446.            BTST.B      #DidWhiteAdj,MiscFlags.L; Did we do the adjust scan?
447.            BEQ    RCCD_NoWhiteAdjust       ; No, skip this...
448.            MOVE.W      DarkLevel.L,D3      ; Load dark level
449.            EXT.L  D3                       ; Extend to long
450.            MOVE.L      D3,D4               ; Copy dark level to D4
451.            MOVE.L      D3,D5               ;   and D5
452.            SUB.L (A2)+,D3                  ; Subtract column average
453.            SUB.L D0,D4                     ; Subtract raw pixel
454.            SUB.W       WhiteLevel.L,D5     ; Subtract white level
455.            MULU.W      D4,D5               ; Multiply
456.            EXT.L  D5                       ; Extend to long
457.           DIVU.W D3,D5                     ; Divide
458.        ; At this point:
459.        ;   D0 = rp(i)
460.        ;   D1 = row counter
461.        ;   D2 = line counter
```

A-10

```
462.        ; D3 = DarkLevel-wa(i)
463.        ; D4 = DarkLevel-rp(i)
464.        ;   D5 = ((DarkLevel-WhiteLevel)*(DarkLevel-rp(i)))/(DarkLevel-wa(i))
465.            MOVE.L    D5,D0              ; The result ends up in D0
466.            ADD.W     D6,D0              ; Add the line adjust
        RCCD_Underflow                       ; Jump if adjust went negative
467.            CMPI.W    #255,D0            ; Greater than 255?
468.            BLS   RCCD_Adjusted          ; No, continue loop
469.            MOVE.W    #255,D0            ; Yes, clip to 255
470.            BRA   RCCD_Adjusted          ; Continue loop
471.        RCCD_Underflow:
472.            CLR.L  D0                    ; Force to zero
473.        RCCD_Adjusted:
474.            NOT.B  D0
475.        RCCD_NoWhiteAdjust:
476.            MOVE.B    D0,(A0)+           ; Store back to memory
477.            DBF   D1,RCCD_AdjustBytes    ; If more bytes, loop again
478.        ; Put a frame on the line...
479.            CMPI.W #0,BorderFlag.L       ; Check if packet mode invoked
480.            BEQ.S RCCD_Nb 481.            MOVE.W BorderShade.L,D5      ; get value
482.            MOVE.B    D5,(A1)            ; Set leftmost two
483.            MOVE.B    D5,1(A1)           ;    pixels high
484.            MOVE.B    D5,PixelsPerRow-2(A1)  ; and also the two
485.            MOVE.B    D5,PixelsPerRow-1(A1)  ;    rightmost pixels
486.        RCCD_nb:
487.        ; Setup for next line...
488.            LEA.L PixelsPerRow(A1),A1    ; Index to the next line
489.            DBF   D2,RCCD_AdjustLine     ; Loop if more
490.        RCCD_WrapUp:
491.        ; Paint a top and bottom line
492.            CMPI.W #0,BorderFlag.L       ; Check if border required
493.            BEQ.S RCCD_Nb2
494.            MOVE.W    #PixelsPerRow,D1   ; Initialize the byte counter (D1)
495.            MOVEA.L   #Scan_Base,A0      ; Point to the first display line
496.            MOVE.L    #PixelsPerRow*{CCD_Lines/2-1},D0; Offset to the bottom line
497.            MOVE.W BorderShade.L,D5      ; get value
498.        RCCD_Lines:
499.            MOVE.B    D5,0(A0,D0.L)      ; Set the bottom line
500.            MOVE.B    D5,(A0)+           ; Set the top line
501.            SUBI.W    #1,D1              ; Reduce the bytes remaining
502.            BNE   RCCD_Lines             ; If more bytes, loop again
503.        RCCD_nb2:          CLR.L D0
504.            MOVE.W InvVid.L,D0           ; Determine what LUT to use, if at all
505.            BEQ RCCD_NoLut               ; if LUT not valid skip
506.            CMPI.W #LUTValid,InvVid.L    ; Is LUT Valid but not selected
507.            BEQ RCCD_NoLut               ; yes, skip 508.        RCCD_Lut:                        ; otherwise perform LUT operation
509.            LEA.L Scan_Base.L,A0
510.            MOVE.L #76800,D2             ; total video pixels
511.            MOVE.W InvVid.L,D0           ; Get Lut type variable
512.            CMPI.W #LutInverse,D0        ; Inverse Lut required
513.            BNE.S RCCD_LNorm
514.            LEA.L ILUT.L,A1              ; Load start of LUT
515.            BRA.S RCCD_IL
```

A-11

```
516.        RCCD_LNorm:
517.            LEA.L LUT.L,A1
518.        RCCD_IL:
519.            CLR.L D0
520.            MOVE.B  (A0),D0              ; get pixel value
521.            MOVE.B  0(A1,D0.L),(A0)+     ; remap value
522.            SUBI.L  #1,D2                ; all memory mapped
523.            BGT.S RCCD_IL
524.        RCCD_NoLut:
525.            LEA.L Scan_Base.L,A1         ; Initialize the data pointer (A1)

526.                                         ;   All lines scanned, exit...

527.            MOVE.L   (A7)+,A3            ; Restore the registers
528.            MOVE.L   (A7)+,A2            ;
529.            MOVE.L   (A7)+,A1            ;
530.            MOVE.L   (A7)+,A0            ;
531.            MOVE.L   (A7)+,D6            ;
532.            MOVE.L   (A7)+,D5            ;
533.            MOVE.L   (A7)+,D4            ;
534.            MOVE.L   (A7)+,D3            ;
535.            MOVE.L   (A7)+,D2            ;
536.            MOVE.L   (A7)+,D1            ;
537.            MOVE.L   (A7)+,D0            ;
538.            RTS
539.        ;   ------------------------

540.            ; This table contains the factors used to compensate for the variation
541.            ;    in brightness in the CRT. The top lines on the CRT are brighter
542.            ;    than the lower lines. Note that when the image is finally shown
543.            ;    on the CRT it will be upside down to compensate for the inversion
544.            ;    of the optics. Since the index we use into this table is derived
545.            ;      from the line counter which down-counts the top line of the image
546.            ;    before inversion has a larger count and will index to the end of
547.            ;    the adjustment table. After the image is inverted for display
548.            ;    the top will be flipped down into the dimmer region of the CRT and
549.            ;    thus will need a higher adjustment number.
550.        ;
551.            ; ... anyway, it all works out...

552.        VA_Base: EQU 0
553.        VA_Step: EQU 2

554.        VerticalAdjust:
555.            DWM  VA_Base+VA_Step*40
556.            DWM  VA_Base+VA_Step*39
557.            DWM  VA_Base+VA_Step*38
558.            DWM  VA_Base+VA_Step*37
559.            DWM  VA_Base+VA_Step*36
560.            DWM  VA_Base+VA_Step*35
561.            DWM  VA_Base+VA_Step*34
562.            DWM  VA_Base+VA_Step*33
563.            DWM  VA_Base+VA_Step*32
564.            DWM  VA_Base+VA_Step*31
565.            DWM  VA_Base+VA_Step*30
566.            DWM  VA_Base+VA_Step*29
567.            DWM  VA_Base+VA_Step*28
```

A-12

```
568.            DWM    VA_Base+VA_Step*27
569.            DWM    VA_Base+VA_Step*26
570.            DWM    VA_Base+VA_Step*25
571.            DWM    VA_Base+VA_Step*24
572.            DWM    VA_Base+VA_Step*23
573.            DWM    VA_Base+VA_Step*22
574.            DWM    VA_Base+VA_Step*21
575.            DWM    VA_Base+VA_Step*20
576.            DWM    VA_Base+VA_Step*19
577.            DWM    VA_Base+VA_Step*18
578.            DWM    VA_Base+VA_Step*17
579.            DWM    VA_Base+VA_Step*16
580.            DWM    VA_Base+VA_Step*15
581.            DWM    VA_Base+VA_Step*14
582.            DWM    VA_Base+VA_Step*13
583.            DWM    VA_Base+VA_Step*12
584.            DWM    VA_Base+VA_Step*11
585.            DWM    VA_Base+VA_Step*10
586.            DWM    VA_Base+VA_Step*9
587.            DWM    VA_Base+VA_Step*8
588.            DWM    VA_Base+VA_Step*7
589.            DWM    VA_Base+VA_Step*6
590.            DWM    VA_Base+VA_Step*5
591.            DWM    VA_Base+VA_Step*4
592.            DWM    VA_Base+VA_Step*3
593.            DWM    VA_Base+VA_Step*2
594.            DWM    VA_Base+VA_Step*1
595.            DWM    VA_Base+VA_Step*0

596.            ;***********************************************************
597.            ;
598.            ; Title:    ID System Handler Routines for the QS 10
599.            ;           Image manipulation module.
600.            ;***********************************************************
601.            ;

602.    FlipTopToBottom:
603.            MOVE.L    A0,-(A7)              ; Save the registers
604.            MOVE.L    A1,-(A7)
605.            MOVE.L    D0,-(A7)
606.            MOVE.L    D1,-(A7)

607.            LEA.L Scan_Base.L,A0             ; Point to first line ...
608.            LEA.L Scan_Top-PixelsPerRow.L,A1; ... and last 609.    FTTB_Loop1:
610.            MOVE.W    #PixelsPerRow-1,D1

611.    FTTB_Loop2:
612.            MOVE.B    (A0),D0               ; Copy upper byte to temporary
613.            MOVE.B    (A1),(A0)+            ; Copy lower byte to upper byte
614.            MOVE.B    D0,(A1)+              ; Copy temporary to lower
615.            DBF   D1,FTTB_Loop2             ; Loop if not done
```

A-13

```
616.            SUBA.L      #PixelsPerRow*2,A1    ; Back up the upper pointer
617.            CMPA.L      A0,A1                 ; Have the pointers met?
618.            BGT   FTTB_Loop1                  ; No, do another row 619.            MOVE.L      (A7)+,D1              ; Restore the registers
620.            MOVE.L      (A7)+,D0
621.            MOVEA.L     (A7)+,A1
622.            MOVEA.L     (A7)+,A0
623.            RTS                               ; Exit
624.     ;      --------------------------

625.        FlipLeftToRight:
626.            MOVE.L      A0,-(A7)              ; Save the registers
627.            MOVE.L      A1,-(A7)
628.            MOVE.L      A2,-(A7)
629.            MOVE.L      D0,-(A7)
630.            MOVE.L      D1,-(A7)

631.            LEA.L  Scan_Base.L,A2
632.            MOVE.W      #CCD_Lines/2,D1

633.        FLTR_Loop1:
634.            MOVEA.L     A2,A0
635.            LEA.L  PixelsPerRow(A0),A1
636.            MOVEA.L     A1,A2

637.        FLTR_Loop2:
638.            MOVE.B      (A0),D0
639.            MOVE.B      -(A1),(A0)+
640.            MOVE.B      D0,(A1)
641.            CMPA.L      A0,A1                 ; Have we finished a row?
642.            BNE   FLTR_Loop2                  ; No, continue 643.            DBF   D1,FLTR_Loop1               ; Loop if not done 644.            MOVE.L      (A7)+,D1              ; Restore the registers
645.            MOVE.L      (A7)+,D0
646.            MOVEA.L     (A7)+,A2
647.            MOVEA.L     (A7)+,A1
648.            MOVEA.L     (A7)+,A0
649.            RTS
650.     ;      --------------------------

651.     ;==============================================  ;
652.     ;                                                ;
653.     ;              Graphics Routines                 ;
654.     ;                                                ;
655.     ;==============================================  ;

656.     ;=PROCEDURE====================================  ;
657.     ;                                                ;
658.     ; Name:                                          ;
659.     ;     DrawCharacter                              ;
660.     ;                                                ;
661.     ; Description:                                   ;
662.     ;     Draw the character in A at the current text text cursor   ;
663.     ;     location in the current size               ;
```

A-14

```
664.    ;                                                              ;
665.    ; Parameters:                                                   ;
666.    ;   Register A - The character code to be displayed.  Any       ;
667.    ;               ASCII character is permitted.                   ;
668.    ;                                                              ;
669.    ; Returns:                                                      ;
670.    ;   Void                                                        ;
671.    ;                                                              ;
672.    ; Algorithm:                                                    ;
673.    ;   N/A                                                         ;
674.    ;                                                              ;
675.    ;==============================================================;

676.    DrawCharacter:
677.            MOVE.L      A0,-(A7)              ; Save registers
678.            MOVE.L      A1,-(A7)
679.            MOVE.L      D0,-(A7)
680.            MOVE.L      D1,-(A7)
681.            MOVE.L      D2,-(A7)
682.            MOVE.L      D3,-(A7)

683.    ;       Begin with the code common to both large and small text
684.            ANDI.W      #7FH,D0               ; Clear possible H.O. bits
685.            ASL.W       #5,D0                 ; There are 16 words per character
686.            LEA.L       CharTab-2.L,A1        ; Index into character table
687.            ADDA.W      D0,A1
688.            MOVEA.L     TextCursor.L,A0       ; Get text cursor address
689.            MOVE.W      #CharHeight,D1        ; Load row loop counter
690.                                              ;   (rows per character)

691.    ;       Now determine which text size...
692.            BTST.B      #TextBig,MiscFlags.L  ; Using big characters?
693.            BNE         DLC1                  ; Yes, display big characters
694.    ;                                         ;   else fall into display small 695.    DSC1:
696.            MOVE.W      (A1)+,D0              ; Get a row of the character
697.            MOVE.W      #CharWidth,D2         ; Set loop count (bits per character)
698.    DSC2:
699.            MOVE.W      D0,D3                 ; Copy character row
700.            ROL.W       #0,D3                 ; Move high byte to low byte
701.            ASR.B       #7,D3                 ; Propagate the H. O. bit
702.            AND.W       TextShade.L,D3        ; Set to proper intensity
703.            ROL.W       #1,D0                 ; Discard the h.o. bit
704.            MOVE.B      D3,(A0)+              ; Store the character pixel
705.            DBF         D2,DSC2               ; Loop if bit counter not 0

706.            ADDA.W      #PixelsPerRow-CharWidth-1,A0; Advance the display row
707.            DBF         D1,DSC1               ; Loop again if more bits
708.            BRA         DC_Exit               ; Go finish up 709.    DLC1:
710.            MOVE.W      (A1)+,D0              ; Get a row of the character
711.            NOT.W       D0                    ; Complement to get white on black
712.            MOVE.W      #CharWidth,D2         ; Set loop count
713.    DLC2:
714.            MOVE.W      D0,D3                 ; Copy character row
715.            ROL.W       #0,D3                 ; Move high byte to low byte
```

A-15

```
716.            ASR.B       #7,D3                       ; Propagate the H. O. bit
717.            AND.W       TextShade.L,D3              ; Set to proper intensity --JJ--
718.            ROL.W       #1,D0                       ; Discard the h.o. bit
719.            MOVE.B      D3,PixelsPerRow(A0)  ; Store the character bit in the next...
720.            MOVE.B      D3,(A0)+                    ;      ...and current row...
721.            MOVE.B      D3,PixelsPerRow(A0)         ;      ...twice
722.            MOVE.B      D3,(A0)+                    ;
723.            DBF     D2,DLC2                         ; Decrement the bit counter and loop
724.                                                    ;    if not -1
725.            ADDA.W   #PixelsPerRow*2-CharWidth*2-2,A0 ; Advance two display row
726.            DBF     D1,DLC1                         ; Decrement the row count and loop again
727.                                                    ;    if not -1

728.    DC_Exit:
729.            MOVE.L      (A7)+,D3                    ; Recover the registers
730.            MOVE.L      (A7)+,D2
731.            MOVE.L      (A7)+,D1
732.            MOVE.L      (A7)+,D0
733.            MOVEA.L     (A7)+,A1
734.            MOVEA.L     (A7)+,A0
735.            RTS                                     ; Exit
736.       ;    ---------------------

737.  ;=PROCEDURE================================== ;
738.       ;                                            ;
739.       ; Name:                                      ;
740.       ;    DisplayMsg                              ;
741.       ;                                            ;
742.       ; Description:                               ;
743.       ;    Display a string of characters terminated by an EOM  ;
744.       ;         character then do a new line.      ;
745.       ;                                            ;
746.       ; Parameters:                                ;
747.       ;    A0 - Address of the message.            ;
748.       ;                                            ;
749.       ; Returns:                                   ;
750.       ;    Void                                    ;
751.       ;                                            ;
752.       ; Algorithm:                                 ;
753.       ;    N/A                                     ;
754.       ;                                            ;
755.  ;============================================ ;

756.    DisplayMsg:
757.            MOVE.L      A0,-(A7)                    ; Save registers
758.            MOVE.L      D0,-(A7)
759.    DM_Loop:
760.            MOVE.B      (A0)+,D0                    ; Load the next character
761.            CMPI.B      #EOM,D0                     ; Is it the end of message?
762.            BEQ     DM_Done                         ; Yes, done
763.            BSR     DisplayChar                     ; No, just display the character,
764.            BRA     DM_Loop                         ;    and loop for the next char.
765.    DM_Done:
766.            BSR     NewLine                         ; Emit the newline
767.            MOVE.L      (A7)+,D0                    ; Restore the registers
768.            MOVEA.L     (A7)+,A0
769.            RTS                                     ; Exit
770.       ;    ---------------------
```

What is claimed is:

1. In an automatic daylight film handling apparatus comprising an initial transport mechanism for transporting a closed cassette containing a sheet of film to an initial station, a cassette opening-closing assembly for opening and closing the cassette once positioned at the initial station, a vacuum-operated lifting and transporting assembly for lifting film from the opened cassette and transporting the film to a patient identification station and then to a subsequent station, a patient information imaging assembly for imaging patient information on a previously unexposed area of the film at the patient identification station, and a substantially light tight housing enclosing the initial transport mechanism, the cassette opening-closing assembly, the vacuum-operated lifting and transporting assembly, and the patient identification station, wherein the improvement comprises the patient information imaging assembly being an electronic patient information imaging assembly comprising:

a scanner apparatus for scanning input information from a patient information card;

an electronic control system connected to the scanner apparatus and capable of processing the scanned input information to output information; and a camera apparatus connected to the electronic control system and for imaging the output information onto the previously unexposed area of the film.

2. An apparatus for handling a cassette and a first sheet of X-ray film contained in the cassette, the sheet having an unexposed area, the apparatus comprising:

a light tight housing having a housing slot for receiving the cassette;

a cassette opening-closing assembly in the housing for opening the cassette for removal of the first sheet and reloading with a second sheet of unexposed X-ray film and thereafter for closing the cassette;

an initial transport mechanism in the housing for transporting the cassette from the slot to the cassette opening-closing assembly and from the cassette opening-closing assembly out the slot after removal of the sheet and reloading the cassette with the second sheet;

a vacuum-operated lifting and transporting assembly in the housing for removing the first sheet from the cassette and transporting the first sheet to a patient identification station and then to a subsequent station;

a film reloading apparatus in the housing for reloading the cassette with the second sheet after the first sheet is removed from the cassette; and an electronic patient information imaging assembly for receiving a patient information card from outside the housing, scanning input information in the housing from the patient information card, electronically processing the input information in the housing, and imaging patient information in the housing on the unexposed area of the first sheet while the first sheet is at the patient identification station.

3. The apparatus of claim 2, wherein the the electronic patient information imaging assembly comprises:

a scanner apparatus for scanning input information from a patient information card, the scanner apparatus including a card holder mounted on an exterior wall of the housing for receiving a patient information card containing patient information to be scanned by the scanner apparatus;

an electronic control system in the housing connected to the scanner apparatus and capable of processing the scanned input information to output information; and a camera apparatus in the housing connected to the electronic control system and for imaging the output information onto the unexposed area of the film.

4. The apparatus of claim 3, wherein:

the housing has a viewing recess above the card holder; and the card holder comprises:
a card holder plate, and
a card window frame mounted on top the card holder plate and defining a slot between the card holder plate and the card window frame, the card window frame defining a window such that an operator can view through the viewing recess and the window to see an image to be scanned by the scanner apparatus from a patient information card inserted in the slot.

5. The apparatus of claim 3, wherein the electronic control system comprises:

means for performing an image manipulation operation on the scanned input information from a set of operations consisting of a white balance operation, a gray adjust operation, a positive/negative image operation, a text addition operation, a border addition operation, an image rotation operation, and image inversion operation.

6. The apparatus of claim 5, wherein the performing means is adapted to perform the image rotation operation such that the camera apparatus images output information on a first side of the unexposed area of the first sheet which is right reading when viewed from a second side of the first sheet after development.

7. The apparatus of claim 5, wherein the performing means is adapted to perform the image inversion operation such that the camera apparatus images output information on a first side of the unexposed area of the first sheet which is right reading and rightside up in a bottom half of the first sheet when viewed from the first side of the first sheet after development.

8. The apparatus of claim 5, wherein the performing means is adapted to perform the text addition operation such that the camera apparatus images output information which includes the input information and additional information on the unexposed area of the first sheet.

* * * * *